US009979611B2

(12) United States Patent
Staykoff

(10) Patent No.: US 9,979,611 B2
(45) Date of Patent: *May 22, 2018

(54) CLIENT-SERVER SYSTEM FOR NETWORK SERVICES AND APPLICATIONS FOR MOBILE TELECOMMUNICATIONS TERMINALS

(71) Applicant: Constantin Staykoff, Sofia (BG)

(72) Inventor: Constantin Staykoff, Sofia (BG)

( * ) Notice: Subject to any disclaimer, the term of this patent is extended or adjusted under 35 U.S.C. 154(b) by 488 days.

This patent is subject to a terminal disclaimer.

(21) Appl. No.: 14/592,124

(22) Filed: Jan. 8, 2015

(65) Prior Publication Data

US 2015/0163102 A1 Jun. 11, 2015

Related U.S. Application Data

(63) Continuation-in-part of application No. 13/377,962, filed as application No. PCT/IB2010/052686 on Jun. 15, 2010, now Pat. No. 8,938,494.

(30) Foreign Application Priority Data

Jun. 17, 2009 (FR) ...................................... 09 02933

(51) Int. Cl.
*G06F 15/16* (2006.01)
*H04L 12/24* (2006.01)
*H04W 4/14* (2009.01)

(52) U.S. Cl.
CPC ...... *H04L 41/5054* (2013.01); *H04L 41/0253* (2013.01); *H04L 41/22* (2013.01);
(Continued)

(58) Field of Classification Search
CPC . H04L 41/5054; H04L 41/0253; H04L 41/22; H04L 41/5051; H04L 41/5064; H04W 4/14; H04W 4/003

See application file for complete search history.

(56) References Cited

U.S. PATENT DOCUMENTS 6,477,366 B1 * 11/2002 Valentine ................ H04M 3/56
455/416
6,501,948 B1 * 12/2002 Salin ....................... H04W 4/16
379/211.02

(Continued)

FOREIGN PATENT DOCUMENTS

| EP | 1345456 A2 | 12/2002 |
|----|------------|---------|
| KR | 100628769 B1 | 9/2006 |
| WO | 2005079084 A | 8/2005 |

OTHER PUBLICATIONS

USSD Menu Browser; XP 0025754162m pp. 1-3, Aug. 1, 2007.

(Continued)

*Primary Examiner* — Benjamin E Lanier
(74) *Attorney, Agent, or Firm* — B. Craig Killough; Barnwell Whaley Patterson & Helms

(57) ABSTRACT

A digital telecommunications client-server system where a network server communicates by a protocol with a digital application located on a mobile terminal. The digital application includes a navigation module, a presentation module, a decoder interpreter module and a transport module. The digital application interprets data received from a network server located in a mobile core telecommunications network and displays interpreted data on a screen of the mobile terminal, with the interpreted data relating to a service or application. The digital application interprets a request of a user entered into the mobile terminal in response to the interpreted data displayed on the screen of the mobile terminal, and sends from the mobile terminal data interpreted from the user's request to the telecommunications network.

18 Claims, 7 Drawing Sheets

(52) U.S. Cl.
CPC ........... *H04L 41/5051* (2013.01); *H04W 4/14* (2013.01); *H04L 41/5064* (2013.01)

(56) References Cited

U.S. PATENT DOCUMENTS

| | | | |
|---|---|---|---|
| 7,370,111 B2 | 5/2008 | Callum | |
| 8,554,567 B2* | 10/2013 | Spier | H04L 65/1063 704/231 |
| 9,430,207 B1* | 8/2016 | Bandhole | G06F 8/38 |
| 2003/0187999 A1* | 10/2003 | Callum | H04L 63/061 709/229 |
| 2004/0229654 A1* | 11/2004 | Farcasiu | G06Q 10/10 455/566 |
| 2008/0064385 A1* | 3/2008 | den Hartog | H04L 29/12009 455/422.1 |
| 2008/0146204 A1* | 6/2008 | Gu | H04L 12/14 455/414.1 |
| 2009/0011745 A1 | 1/2009 | Cha | |
| 2009/0061943 A1* | 3/2009 | Kamgaing-Kouam | H04M 1/72561 455/566 |
| 2010/0238893 A1* | 9/2010 | Vikberg | H04W 60/02 370/329 |
| 2012/0089674 A1 | 4/2012 | Staykoff | |
| 2013/0053060 A1* | 2/2013 | Vijaykumar | H04W 4/14 455/456.1 |
| 2014/0199961 A1* | 7/2014 | Mohammed | H04L 63/0428 455/406 |
| 2014/0302825 A1* | 10/2014 | Mogalapalli | H04W 4/14 455/414.1 |

OTHER PUBLICATIONS

Database WPI Week 200731, Thomson Scientific, London, GB, AN 2007-319858 XP 002575155 & KR 100628769B1 (LG Electronics Inc) Sep. 20, 2006 (Sep. 20, 2006).

USSD Services for Interactive Mobile Users—Building User-Friendly Mobile Telephony Applications Using Dialogic TM Distributed Signaling Interface Components, pp. 1-17.

Anonymous: "Redefining over-the-phone customer service" Internet Article, Online Mar. 31, 2008, URL: http://www.voiceobjects.com/files/en/voiceobjects_7_products_brief_en.pdf.

Internet Citation; Jun. 23, 2005 (Jun. 23, 2005) pp. 1-2; Retrieved from Internet; URL:http://www.eurasip.org/Proceedings/Ext/IST05/papers_M.html.

The Moriana Group: "Service Delivery Platforms and Telecom Web Services—An Industry Wide Perspective," Online Jun. 30, 2004, Mac Taylor, URL:http://www.moriangroup.com/.

Kavadias, et al., MobileIN: Harmonized services over heterogenrous Mobile; IN and WLAN infrastructures.

Albatross; IS-2001-34780/FOKUS/WP3/D8; Albatross Intermediate Architecture and Specifications.

* cited by examiner

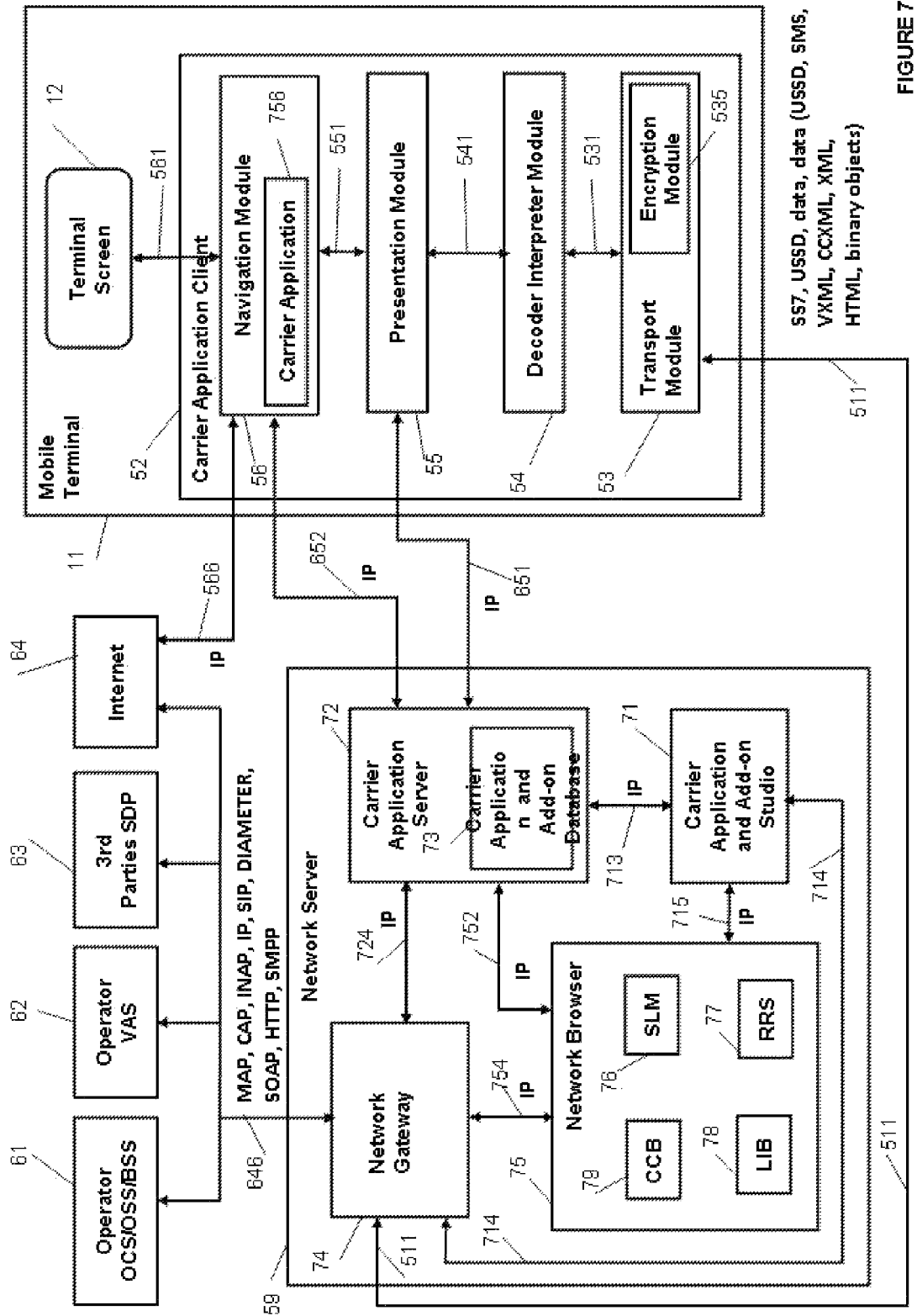

CLIENT-SERVER SYSTEM FOR NETWORK SERVICES AND APPLICATIONS FOR MOBILE TELECOMMUNICATIONS TERMINALS

This application is a continuation in part of application Ser. No. 13/377,962, filed Dec. 13, 2011, which is the National Stage of International Application No. PCT/IB2010/052686, filed Jun. 15, 2010, which claims priority to foreign Application No. 0902933 filed in France on Jun. 17, 2009, the benefit of which is claimed hereby.

FIELD OF THE INVENTION

This invention relates to a client-server system for network services and applications for mobile telecommunications terminals.

BACKGROUND OF THE INVENTION

The present invention relates to conversational client-server applications, and more particularly, relates to the field of dynamic dialogues between a mobile telecommunication terminal and a network or a server for applications and services, using interactive interfaces. The invention provides to the terminal to reach a server or other terminals, to dialogue, navigate, exchange information, download applications and data (text, graphics, video, audio, images and other), and use different applications and services.

The present invention relates to mobile telephony, expanding new features and interactive services, and a convergence of dialogue between heterogeneous devices, such as mobile phones, mobile devices, digital applications and services platforms, Internet servers, third parties services and equipment, and other devices. Moreover, the invention provides the additional requirement of highly useful ergonomics for terminals users, such as real time services requirements, which are in accordance with the resource constraints of mobile infrastructures (servers, networks bandwidths, real time constraints) and mobile terminals (limited processing, storage and display capacities).

There is a need for client-server systems that implement and use protocols with dynamic, interactive, intuitive features that are easy to use and allow fast integration with low resource consumption. Such systems should provide interoperability, customization and effortless deployment.

There is a need for a client-server system for applications and services that allows multiple and reusable applications and services having reduced costs, while targeting a large number of users. An objective of the invention is to provide interactive services that are compliant with existing and emergent technologies, without costly implementation, and preferably, without or with minimal modifications of existing equipment managed by network operators. Another objective of the invention is to provide such applications and services, without or with few modifications to user terminals, while providing a dynamic, interactive, user-friendly interface at terminals, and satisfying real time constraints.

Another objective is to have means to reach a variety of information with only short delays, such as by obtaining information via a telecommunications network from a mobile terminal in local mode, or in roaming or nomad mode.

Thus, capacity constraints of the user terminals must be taken into account, as well as network performance and inherent ergonomics problems.

Furthermore, in existing client-server systems, distribution of the "intelligence" or of different portions of services between the network and the terminal is a problem. The term "intelligence" includes the capability to decide the management or the execution of an action, a process, or data processing. For example, "intelligence" is used with the aim of providing complementary functional possibilities, flexibility and independence, versus constraints and/or user needs.

Embedding clients on mobile terminals that are compliant with network and mobile terminal constraints, at the expense of ergonomics, or providing functional and user-friendly user interfaces at the expense of the quality of service (response time, number of proposed services, real time services) is not satisfactory. Such approaches require the client to connect to a server with special means to reach information, and to navigate, download, save or transfer applications and data.

Optimization between the equipment constraints (networks and terminals), real time aspects, ergonomics and number of features and services is not satisfactory in the current systems.

Concrete applications and services are possible based on navigation using standard protocols that are WEB like (World Wide Web or Internet), such as HTTP protocols (HyperText Transfer Protocol), XML (eXtended Markup Language, an extended markup language for describing and analyzing data), IP (Internet Protocol) or others, in combination with standard transport protocols TCP (Transmission Control Protocol, one of the basic protocols for IP data transmission), UDP (User Datagram Protocol, protocol for data transmission being part of the TCP/IP protocol) and others, which do not provide optimal response time for queries, and therefore, fail to provide satisfactory real-time services.

Limiting the scope of the access to some services and applications based on simplified protocols taking into account the limited capabilities of mobile phones, for example the WAP protocol (Wireless Application Protocol), especially designed for mobile phones is unsatisfactory. This approach is at the expense of ergonomics and multi services, and does not ensure the provision of real-time services.

Applications embedded in mobile phones in some cases require download and installation of dedicated software on the terminal, which may be demanding in terms of mobile terminal resources, and does not guarantee real-time services.

SUMMARY OF THE INVENTION

A digital telecommunications client-server system where a network server communicates by a protocol with a digital application located on a mobile terminal. The digital application includes a navigation module, a presentation module, a decoder interpreter module and a transport module. The digital application interprets data received from a network server located in a mobile core telecommunications network and displays interpreted data on a screen of the mobile terminal, with the interpreted data relating to a service or application. The digital application interprets a request of a user entered into the mobile terminal in response to the interpreted data displayed on the screen of the mobile terminal, and sends from the mobile terminal to the telecommunications network data interpreted from the user's request.

DESCRIPTION OF THE DRAWINGS

The present invention will be better understood when considering the attached reference figures showing respectively:

FIG. 7 presents a preferred system architecture embodiment of the client-server system with a network server having particular architecture, located in a mobile telecommunications core network, and communicating with core network elements, with applications and services platforms and with a carrier application client embedded in the mobile terminal.

DESCRIPTION OF PREFERRED EMBODIMENTS

Figure 1A:
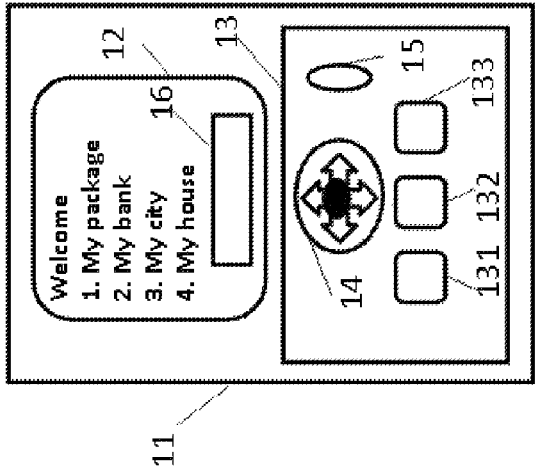
FIGS. 1A, 1B, 1C and 1D present a user interface, as well as navigation steps for a mobile terminal not having an embedded USSD client module.

The present invention is based on standards and existing protocols, including USSD (Unstructured Supplementary Service Data), open and already implemented in a native way in the devices, and fully or partially available. It may be based on native networks and terminal features by offering a generic client-server system, which provides multiple applications and multiple services. In a first embodiment, the present invention relates to a generic smart USSD client module embedded in a telecommunication terminal.

In the present invention, the term "client" is understood to mean an application having its own embedded navigator, or using a third embedded navigator, the application itself being embedded in the terminal and not in the telecommunication network. This network is, for example, a GSM (Global System for Mobile), GPRS (General Packet Services, communications system with access using packets services), UMTS (Universal Mobile Telecommunications System), 3G/3G+, 4G LTE (Long Term Evolution) and/or any other network such as NGN (Next Generation Network). The term "module" is understood to mean a hardware component of system architecture or a software component that carries out specific functions and/or provides specific features.

The present invention addresses the weakness of the prior art via a client-server system based on standard network protocols such as USSD, for example, where the server for applications and services is located in a core network of a mobile telecommunications network, a computer network, or another network. This server for applications and services is based on an interpreter of a structured by conversational objects language, such as XML (Extensible Markup Language), VXML (Voice Extensible Markup Language), language voice extended tagging (which means an application programming interface for communication using peripheral devices related to the telephony), CCXML (Call Control extensible Markup Language) or another.

The user equipment, such as a terminal, is for example, a mobile phone (such as a cell phone), a PDA (Personal Digital Assistant; handheld computer combining many functions), a multi-functions board computer, or similar for a vehicle, a home or business multi-platform, including, for example a monitoring or safety function, or any other fixed or mobile device being able to communicate with at least one network.

In the present invention, the term "user" is understood to mean an individual subscriber to at least one network or end user, which is fixed, nomadic or "Roamer" (itinerant subscriber in the sense of "roaming" between networks) to the network. The term "user" may also mean a telecommunications network operator or a third party, for example a provider of applications, of services, of content or of any equipment (for example, alarm or signaling equipment).

A purpose of the present invention is a client application embedded in a mobile telecommunications terminal that is able to communicate and to share data with a server and/or a network, based on real time telecommunications protocols such as USSD. The client satisfies requirements for real time, low resources consumption, multi functions and integration with its own ergonomics, or with third party ergonomics used in the terminal.

In a general embodiment, the present invention relates to a digital telecommunications client system based on at least one USSD protocol, with the USSD client, located in at least one mobile terminal, and including means for:

Receiving and interpreting at least one data and/or at least one instruction from at least one telecommunications network;

Displaying as text and/or graphic on a screen and presenting on the terminal at least one data and/or at least one instruction from the network;

Interpreting and sending back to the network at least one request and at least one message of at least one user, in function of at least one data and/or at least one presented service;

Communicating with at least one server of at least one third party such as any USSD server, on-device-portal server or other suitable device.

Advantageously, the USSD client includes at least one transport module including at least one encryption module, at least one decoder interpreter module and at least one presentation module.

In one embodiment, the USSD client includes at least one navigation module.

In another embodiment, the navigation module is a third party and/or terminal specific application.

In one implementation, the USSD client is based on at least one interpreter of structured languages such as HTML or XML or VXML or CCXML or other suitable language.

In another implementation, the presentation module is a transformation module to any presentation language and includes means for modifying the processed contents (modification, filtering, suppression, content addition and other).

In a preferred embodiment, the USSD client includes means for operating as an USSD server versus at least one other terminal and/or at least one network.

The present invention also relates to a processing method implemented by the USSD client system which is composed of at least:

A step for sending at least one query from at least one user with an USSD client to a telecommunications network, opening a session between the USSD client and the network;

A step of query interpretation from the network, followed by a return of at least one information to at least one terminal;

A step of processing of the received information by the USSD client and of displaying of the information as text and/or graphic on a screen of the mobile terminal;

A step of choice and validation of at least one choice by using at least one simple pressing on a keyboard;

A step of sending the user choice to the network;

A step of interpreting the choice by the network and sending back at least one requested information;

A step of displaying the received choice on the user's screen.

Advantageously, the step of choice and validation of at least one choice is performed with at least one simple pressing on specific text and/or graphic areas, by using at least one key of a keyboard of the terminal.

In a first embodiment, the method includes a step of support and management of at least one feature "ringing" by the user and/or by the network service.

In a second embodiment, the method includes a step of support and management of at least one feature advertisements and/or customized information during at least one user session, the advertisements and/or customized information being dynamic or static.

In a third embodiment, the method includes a step of support and management of the proprieties of the terminal and of the network to which the terminal is attached.

In a fourth embodiment, the method includes a step of support and management of at least one additional feature, relative to at least one application available on the terminal.

In a fifth embodiment, the method includes a step of support and management of at least one feature "USSD bookmark."

In an embodiment, the method includes a step of externalization of at least one content of at least one current page, and/or of at least one session or portion of a session, the step of externalization being a backup or archive or transfer from the USSD client to any external application.

In another embodiment, the method includes a step to restore at least one session on the mobile terminal.

In a preferred embodiment, the method includes a step of visual management of at least one session, including the duration of the session, as well as the duration of the user's interactivity during the session and a verification of continuity of the session.

In another preferred embodiment, the method includes a step of management of one or many USSD messages as at least one USSD message, the virtual USSD message.

Advantageously, the virtual USSD message includes text, images, graphics or audiovisual contents.

In one implementation, the method includes a step of simulation and/or management of at least two USSD sessions, activated in parallel for the same terminal.

In another implementation, the method includes a step of customization of at least one service for at least one user by the USSD client and/or remotely by the network.

In a preferred embodiment, the method includes a step of encryption, with or without visual indication of the data and/or of services, with at least one custom security key or with at least one security automatically managed by the client and by the server.

The present invention will be better understood when considering the non-limiting embodiment described below.

In the classical case, an USSD message is sent by typing on the terminal keyboard a sequence, for example, *123*1*2#, followed by pressing an "Enter" key.

When an USSD message is emitted from the mobile, it is always directed to a "home network," in which there is an USSD equipment, such as an USSD server with a browser, called in the present invention "USSD Center". This network USSD Center interprets the USSD query and then sends back a requested information and/or menu.

For instance, a menu with list of choices is displayed on the terminal screen, where every choice is, for example, a number 1, 2 or 3. In order to make a choice, the user has to press the right number on the keyboard, and then validate by using another key.

This manual USSD navigation mode doesn't need any modification in the user terminal and the network services are directly usable. However, this solution for USSD navigation is not satisfactory from ergonomics and usability point of view.

The user wastes a lot of time in manual interaction. Also, with increasing complexity of mobile terminals in term of features, a complementary technical problem occurs: the user phone is more complicated (for example, having extended keyboard, special and complementary keys, touch screen, "smart phone" evolution (evolved cell phone offering personal assistant features) and other devices. It therefore becomes more difficult for the user to navigate by pressing different keys.

The embedded mobile USSD client, purpose of the present invention, contributes for an enriched user experience via advantages such as ergonomics, especially improving and multiplying networks services in regards to various topics such as security, facility to connect and maintain the connection, response time and information access time, new features, services and data customization, and other advantages.

In the present invention, the term "data" is understood to mean information and/or at least one instruction, and/or at least one structured or unstructured digital content, the data being textual, graphic, audiovisual or any other type of content.

The availability in the terminal of an embedded USSD client that is equipped with a browser having a user navigation interface overcomes the aforementioned drawbacks of the prior art. The client is installed as a standard application in the mobile phone. The browser included in the client is based on at least one structured language interpreter (for example, HTML (Hypertext Markup Language) descriptor, XML, VXML, CCXML (Call Control XML; XML for the call control feature) or other.

In another embodiment the client does not include a navigator, and cooperates with at least one navigator, or with an application specific to the terminal.

FIGS. 1A, 1B, 1C and 1D present user interface and navigation steps for a mobile terminal not having an embedded USSD client module.

The module (11) is a cell phone with screen (12) and keyboard (13), including keys, for example (131) (corresponding to number 1), (132) (corresponding to number 2) and (133) (corresponding to number 3). A navigation key (14) allows navigation via keystrokes (left, right, up, down) and selection via a central keystroke.

A validation key (15) or standard "enter" key is also available. Navigation steps are detailed in FIGS. 1A, 1B, 1C and 1D.

When user decides to connect to the USSD Center, he/she types on keyboard (13) an USSD code, for example: #123*1*2#. This code is then sent to the USSD Center, a session is opened and the USSD Center returns back the required menu displaying on screen (12) for example:

Welcome
    1. My package and options
    2. My bank
    3. My city
    4. My house The item "My bank" is an example of service with encrypted USSD session, the item "My city" is an example of service for Internet information retrieval via USSD and the item "My house" is an example of service for house automation management via two USSD terminals.

Figure 1C:
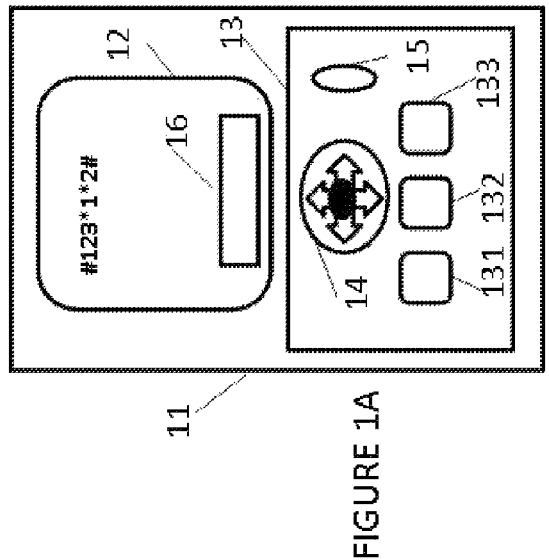
Figure 1B:
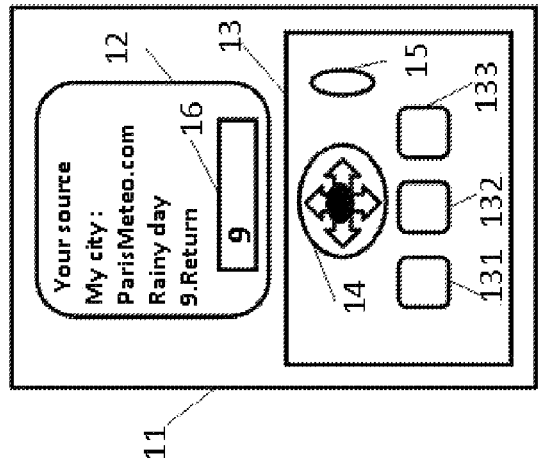
Figure 1D:
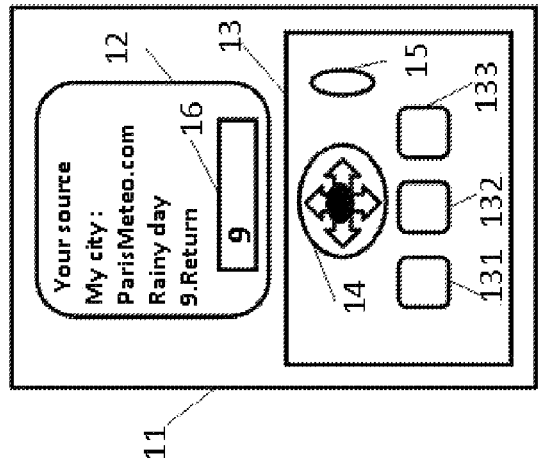

In this case, the navigation method includes the next steps:

A step for an USSD code dialing on keyboard (13) and dialing validation via pressing key (15), as shown on FIG. 1A;

A step for a connection and menu display, as shown on FIG. 1B;

A step for making a choice with keyboard (13) via keys (131), (132), or (133); this choice being then displayed in a window (16) on the bottom of the screen (12), and then confirmed using validation key (15), as shown on FIG. 1C;

A step of displaying the selected content, as shown on FIG. 1D, which displays at least one required piece of information, for example:
Your source My City:
ParisMeteo.co
Rainy day
Return When the user wishes to come back for example in the previous menu, he/she presses on the keyboard the displayed number, as per screen (16) and then confirms the validation key (15) for example.

FIGS. 2A, 2B, 2C and 2D present a non-limiting embodiment where the mobile terminal has embedded USSD client.

When the user requests for a service, he/she connects directly through the user interface of the mobile terminal, for example presented as icons (21), (22), (23) and (24), on screen (12) of mobile terminal (11). An icon may be as interactive picture or similar graphic display presented on a mobile terminal screen (12), providing means for the end-user to navigate in menus. The USSD Client (24) is available and accessible directly or not, via the interface. By using navigation key (14), the user selects and activates the USSD client (or a cooperating application).

Figure 2A:
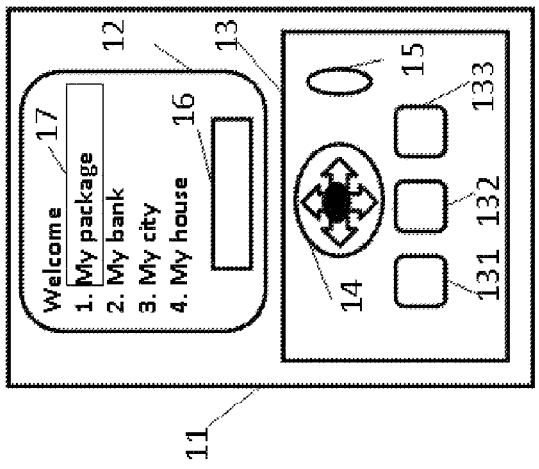
FIGS. 2A, 2B, 2C and 2D present a user interface, as well as navigation steps for the USSD client embedded in the mobile terminal.
Figure 2B:
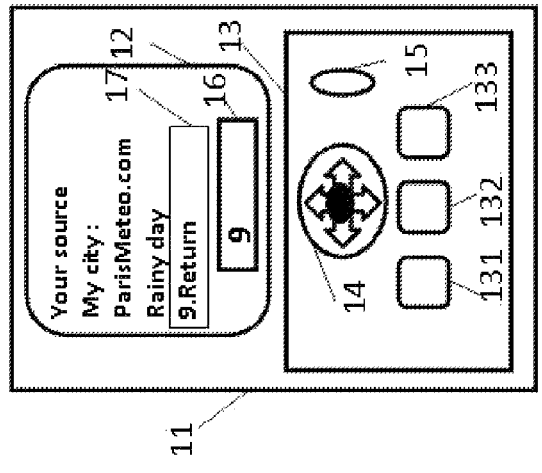
Figure 2C:
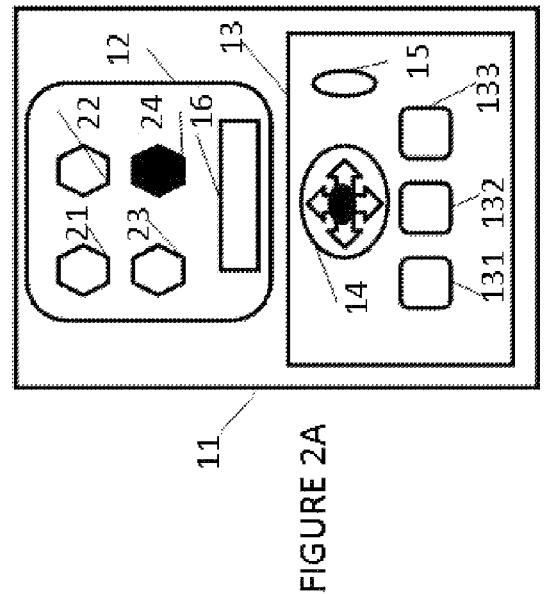
Figure 2D:
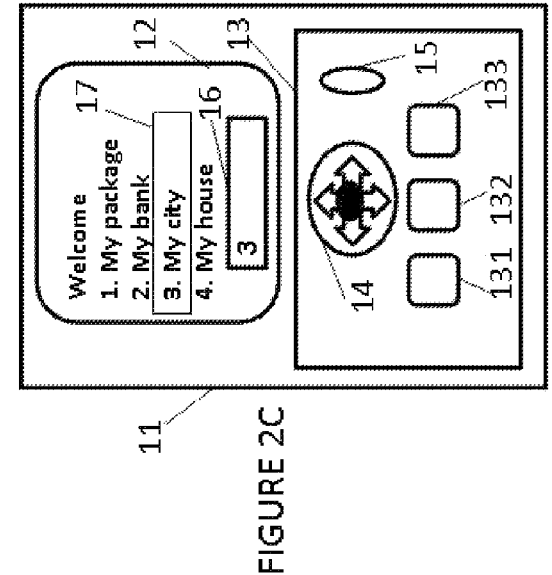

A list of predefined and customizable USSD favorites "Bookmarks," also known as "signets" in French, is then displayed. When the user makes a choice, the corresponding USSD query is sent to the network and it returns back a menu of request services, for example the following menu:

Welcome
    1. My package and options
    2. My bank
    3. My city
    4. My house In this case, the navigation method includes the following steps:

A step for scrolling via navigation key (14), positioning on icon (24) and validating via central press on navigation key (14), as shown on FIG. 2A;

An optional step for displaying a predefined and customizable list of bookmarks and possible options in this list;

A step for automatically sending of USSD query to the network, followed by a menu displaying, as shown in FIG. 2B. A selection cursor (17) is indicated, designating an initial default location in the displayed menu;

A step for scrolling selection cursor (17) by using navigation key (14) and validating the made selection via navigation key (14), as shown on FIG. 2C. After selection, user choice is automatically displayed in a window (16) on bottom on the screen (12);

A step for displaying the selected content is shown on FIG. 2D, for example:
Your source
My city:
ParisMeteo.com
Rainy day
Return Advantageously, navigation and choice selection are done, for instance, by using validation key (15) or by using navigation key (14), or by using a predefined key of the digital keyboard (13) or by using a "soft key" (virtual dynamic key).

Advantageously, validation key (15) is merged with navigation key (14).

Figure 3:
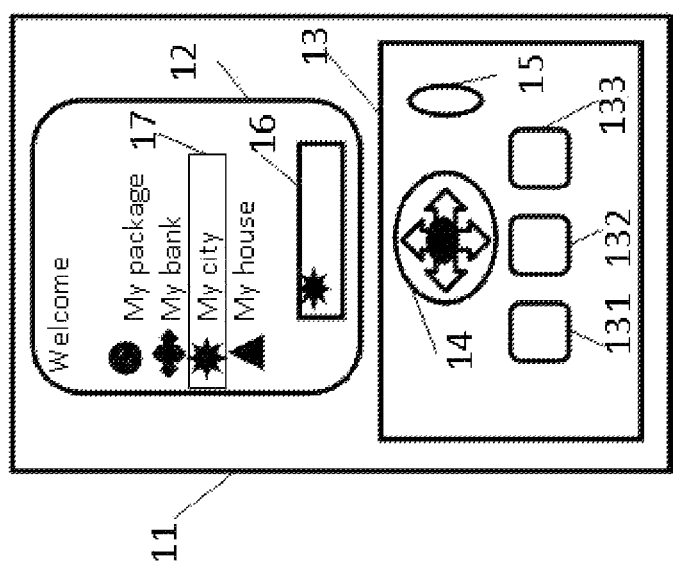
FIG. 3 presents a particular embodiment of the user interface for the USSD client, embedded in the mobile terminal.

FIG. 3 represents a particular embodiment of FIG. 2B, an example of improvement by using graphical elements for presentation of menu lists displayed after a user request. In one implementation, the graphical elements are sent by the network. In another implementation, a stock of graphical elements is in the terminal and used by the client for display. The use is predefined and customizable by the USSD client, or remotely by the network. In a preferred embodiment, the presentation of menu lists is performed entirely with graphical elements.

Figure 4:
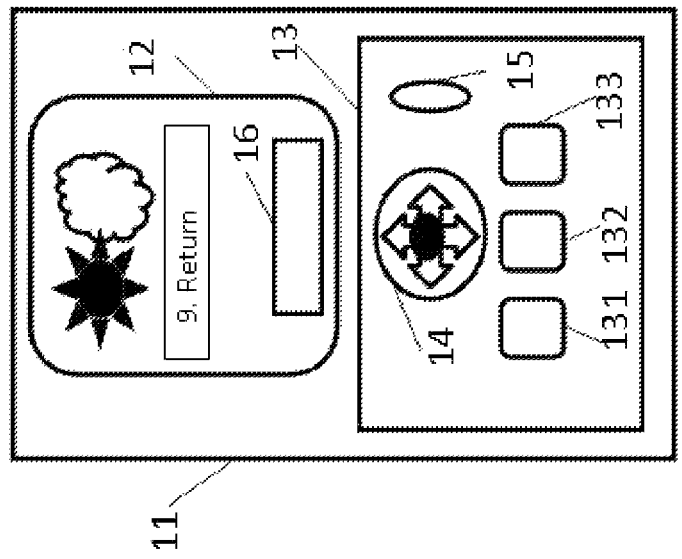
FIG. 4 presents another preferred embodiment of the user interface and display for the USSD client, embedded in the mobile terminal and cooperating with another navigator available on the mobile.

FIG. 4 represents an embodiment of FIG. 2D. The USSD client includes a graphical transformation layer embedded in a navigation module, which is able to translate data as enriched page and/or graphic, for example HTML page, as shown in the example in FIG. 4.

The USSD client, as described in FIGS. 2, 3, 4 and 5 has the following features and advantages:

Transparency of the connection for the user (induced by the USSD technology);

Improved USSD interactivity for the user. The user has the possibility to perform at least one step of the method several times and to make at least one iteration of the steps using simple navigation keys;

Support and management of the feature "ringing" when receiving an USSD message. The ringing feature, when either not present, or systematic for the terminal, represents a major and known disadvantage for service rendering. In order to compensate for this defect, the ringing option is either enabled, or disabled, or controlled by the user, the service, the network and/or the content;

Support and management of the feature "Branding," customized advertisement for the promotion and the management of a brand. For example, a mode of implementation of this feature is a page such as HTML relative to an advertisement and/or brand and/or appellation, which is displayed as wallpaper;

Support and management of the feature "Sponsoring," dynamic or static advertisement managed by the service and/or the USSD client, and displayed by the USSD client, for example in a reserved area;

Display of the session information, as for instance the number of scrolled USSD pages, the number of at least one page, the display of at least one already selected choice, the "come back to" page in the memory cache at client level;

Support and management of the terminal properties and of the network to which it is attached. The USSD client can decide to send these properties on demand or automatically during the USSD session, and to various network services. Thus, the USSD client manages, for example, parameters such as IMEI (International Mobile Equipment Identity), MCC (Mobile Country Code), MNC (Mobile Network Code), LAC (Local Area Code) and others;

Support and management of the terminal properties regarding additional features relative to the applications implemented in a mobile phone (11) from terminals manufacturers, or applications from telecommunications operators, or from services providers, or from any third party; these applications being previously downloaded on the mobile terminal (11), or being located in any remote server to which the terminal (11) has access. For example, when the terminal has a geo-location feature, such as GPS (Global Positioning Service; positioning in the geographical-location), the client module (52) includes means to interpret and to manage geo-location information and services. In this case, by using client (52), the user has the ability to access not only standard geo-location services, but also high value added services, such as emergency services, tracking and alerts. Another embodiment, are the services related to the POI (Points of Interest). In a preferred embodiment, the feature "Branding," provides a customized advertisement and is performed relative to the geo-location of the user and/or his/her mobile phone (11). These embodiments for the management and support of terminal properties are also operational in case of geo-location performed by at least one cell of the mobile telecommunication network, or Cellular Identification, by using local area networks terminals, as for example Wi-Fi (Wireless Fidelity; wireless local network) and others;

Support and management of USSD "bookmark" feature or other bookmarks. In a special embodiment, the bookmark is tagged, for example, as a form that can be completed offline, outside a USSD session, thereby avoiding the inconvenience of session interruptions. In another implementation, the bookmark is hierarchical.

End-to-end data and services encryption/decryption. In current 2G-3G mobile networks, the information conveyed by the USSD channel is not secure. Following requests from operators, users and third parties, this information is encrypted/decrypted end-to-end by the USSD client at content and/or at service level. For example, for at least one USSD service, the user can install a custom security key or choose a security key automatically managed by the client (52) and the server (59). The USSD client (52) adds additional security for data transfer over USSD for compatible network services provided by USSD Center (59) which also support the same security standards. The transport module of the USSD Client encrypts the content of the USSD messages to be sent and decrypts received USSD messages using standard symmetric-key cryptographic algorithms, for example 3DES (a mode of the "Data Encryption Standard" encryption algorithm that encrypts data three times) and AES (Advanced Encryption Standard). The end-to-end encryption reduces the maximum number of characters. The exact length depends on the block sizes of the cryptographic algorithm. According the cryptographic standards for symmetric-key algorithm a same key must be used for encryption and decryption. This security key has to be set by the provider of the network services or retrieved automatically over USSD using key exchange algorithms. For example the Diffie-Hellman algorithm is used for key exchanged over USSD in association with information from the network such as IMSI (International Mobile Subscriber Identity), MCC, MNC, etc. The USSD client (52) can use same security key for all secure USSD services or to store different key for each secure USSD services. Thus, the USSD client (52) provides additional security for secure information exchange on the USSD channel, with an USSD center (59) supporting the same standard encryption-decryption. Thus, additional end-to-end security is provided for USSD messages. Encryption of the USSD data, performed by the module (535) is performed in order to respect the size of USSD standards and therefore USSD channels bandwidth.

In one implementation, the USSD client (52) proposed dynamically visual indication for the USSD security.

During navigation, or when out of navigation mode, the USSD client has the capability to save one or many pages in the terminal, and to send at least one selected page or at least one part of at least one selected page to the network, for example, as SMS (Short Message Service; short text message that can be transmitted and received from a mobile phone), as MMS (Multimedia Message Service; multimedia message that can be transmitted and received from a mobile phone), as email and other message forms. Also, the USSD client has the capability to do complete or partial archives of the session.

Indication and management of a "navigation skin" application is provided. This application is downloadable on mobile networks, thus allowing operators to customize the subscriber's navigation and/or services in the terminal.

Additional applications available from navigation, for example, are applications that can be launched with a simple touch on specific text and/or graphic areas on the screen (12) of mobile terminal (11), where the screen (12) is a touch screen.

A feature for session restoration (or recovery) from the USSD client is provided. This session restore option is active if a session is interrupted. The USSD client manages an automatic restore by reconnecting to a network service, via any communication channel, transparently to the navigation feature.

An additional feature is provided, which manages and verifies the duration and the continuity of an USSD session. The duration of an USSD session is generally unknown by the user, and an USSD session in which the user remains passive for some time (for example during one minute), and in previously known systems, may be interrupted without warning. To improve the ergonomics of the USSD user interaction, the USSD client (52) may provide visual management of the session, and of the session duration, as well as verification of the duration of user inactivity and of session continuity.

In one embodiment, the session is interrupted after a specified period of inactivity, and a warning message is displayed on the screen (12) of the terminal (11). In another embodiment, the session is automatically extended in a manner that is transparent to the user, i.e. without displaying a message on the screen (12) of the terminal (11).

In yet another embodiment, the client (52) has means to customize management of virtual USSD messages, i.e., the management of one or many USSD messages as at least one USSD message, said virtual USSD message. The USSD client (52) performs the management of one or many classical (182 characters GSM encoded per 7-bit) USSD messages grouped in a long USSD message. By using the USSD client, the dedicated channel to this long USSD message is, for example, used as a virtual channel for downloading of non-USSD data, such as text, images, graphics or audiovisual contents.

Figure 5:
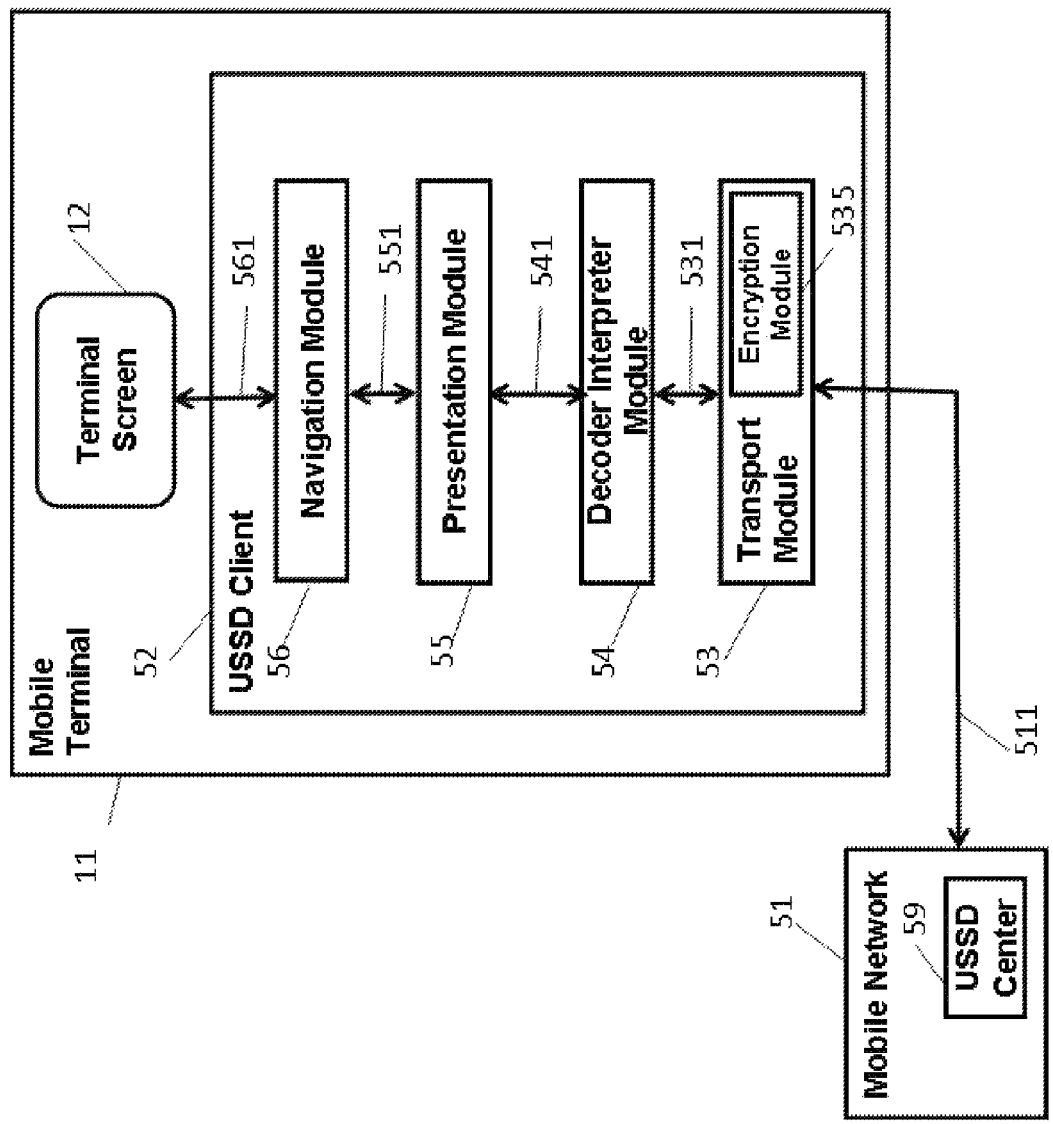
FIG. 5 presents a general architecture example of the client-server system, especially for the USSD client module embedded in the terminal.

An embodiment of the client-server system architecture, particularly of the USSD client module architecture is presented in FIG. 5. In this embodiment, the client-server system intelligence is located in the USSD client (52).

The mobile terminal (11) includes an USSD client module (52) software integrated with the native telecommunications platform of the mobile terminal (11).

The USSD client (52) includes a transport module (53), with services encryption/decryption module (535), which receives USSD data from any network (51), for example, from a network with an USSD Center (59), and transmits the USSD data via a link (531) to the module (54), which is the decoder interpreter.

The module (54) has, for example, a function to decode the USSD messages, and to convert them into a structured language. The module (54) may transmit the decoded data via a link (541) to a presentation module (55), for example, a transformation module using HTML language, or using any other presentation language.

A function of the module (55) is to format the data to optimize the display. The presentation module (55) preferably includes means to modify the processed content by using transformation, filtering, suppression, content addition and other processing functions.

The module (55) may send, formatted for presentation, data via a link (551) to a module (56) such as standard WEB navigator (or "Browser"). Moreover, the USSD client (52) preferably has the capability to communicate and to automatically adapt itself to at least one third client-server system, such as any USSD server, On-Device Portal (embedded portal) and others, and thus, in a transparent or declared manner for the server. The data provided from the navigator module (56) is sent via a link (561) to the display (12) of the terminal (11).

The presented USSD client (52) architecture on FIG. 5, allows integration with at least one navigator, such as WEB or any other mobile terminal application or user application. In addition, this USSD architecture allows the USSD client to be embedded into at least one navigator such as WEB or any other mobile terminal or user application.

When a query is sent by the terminal (11) to the network (51) via a link (511) by using USSD protocol or MAP protocol for example, a session is opened between the network (51) and the USSD client (52) which successively share data via the transport module (53), the decoder interpreter module (54), the presentation module (55) and the navigation module (56). The navigation module transmits the data for display at the required format via a link (561), and data is displayed on the screen (12) of the terminal (11).

The described features and characteristics of the USSD client are illustrative and not limiting embodiments. Many other features are implemented on demand or during a user customization of the USSD client.

Based on a native USSD standard, the USSD client, purpose of the present invention, is operational with any type of USSD network services.

The USSD client includes a graphic presentation enhancement module (56), supporting different user interface graphic presentations. These presentations are based on descriptors of structured languages and format, such as the standard formats HTML, CSS (Cascading Style Sheet; style sheet format for Internet Browsers), DOM (Document Object Model; document template independent of all programming languages and of all platforms), SMIL (Synchronized Multimedia Integration Language; language allowing the synchronization of different multimedia elements on a WEB page), SVG (Scalable Vector Graphics; description language for vectors graphic sets based on XML), LASER (Lightweight Application Scene Representation), SAF (Simple Aggregation Format; binary format for integration in the same stream LASER contents and audio/video contents), or such as proprietary formats as Macromedia Flash; or a kind of Rich Media format (formats using advanced techniques to transfer and display of multimedia data (audio, video, still images, graphics, text) and for interactive user interface).

In the generic case, the presentation is either as lists, or in multimedia form, or mixed.

Preferably, the USSD client (52) has the capability to manage advanced value added features, as for example:

Performs automatically restoration of interrupted USSD session. When an USSD session is interrupted, for example, due to expiration, data relative to the interruption point is sent to the USSD service by using a new USSD session. In another embodiment, data relative to the interruption point is returned to an USSD service, for example, via the SMS channel. This allows the USSD service to reactivate the session from the referenced interruption point, thus, from the network to the USSD client. These two methods for recovery of an expired USSD session are transparent to the user; Has the capability to commute an ongoing USSD session towards a phone call, SMS call, Internet call or another function;

Proposes options where the client analyzes service pages and performs a synchronization with the server in regards to available user options in the pages, i.e. performs a synchronization between pages stored on the server in memory "cache" (temporary saving in memory of at least one part of the session) and an ongoing page among already received pages;

Offers the possibility of restoring navigation history from the last session, or from at least one archived session;

Offers the possibility of performing one or many simultaneous choices from the same navigation page;

Has the capability of simulating and/or managing many parallel activated USSD sessions for the same terminal, thus allowing the user to navigate in many services at the same time. In a preferred embodiment, this capability is implemented by sing memory "cache" at the USSD service and USSD client level;

Has the capability of controlling the USSD navigation via voice commands;

Had the capability of integrating a mobile terminal (11) having touch screen (12), and to ensure the navigation, as well as all described services. In this case, a simple user's touch on a specific area of the touch screen (12) allows him/her to reach a multitude of applications and services;

Has the capability of restoring the request from the user information via a voice synthesis;

Has the capability of operating in the terminal as an USSD server, in order to communicate with other terminal clients through or pass-through the mobile network. For example, it is used to take control of an USSD terminal by another terminal (USSD or not), for information retrieval from a terminal, for navigation and for remote launching of services on the terminal, for the transformation of an USSD terminal into any remote control equipment and/or into any application server;

Has the capability of detecting a conventional USSD session and proposing navigation assistance or automatically overtaking the USSD session.

In one embodiment, the client-server system intelligence is located in the USSD client (52). In another embodiment, the client-server system intelligence is located in an USSD server (59) of the mobile telecommunication network (51). In yet another embodiment, the client-server system intelligence is located in the USSD server (59) of the mobile telecommunication network (51) and in the USSD client (52).

In a preferred embodiment, where the client-server system intelligence is located in a client (52), the USSD client (52) for using of digital applications and services is based on at least one USSD protocol, and is located in at least one mobile terminal (11). This USSD client includes means for receiving and interpreting at least one data and/or at least one instruction from at least one telecommunications network (51), means for displaying in text and/or in graphic on a screen (12) and for presenting on the mobile terminal (11) at least one data and/or at least one instruction from the network (51), means for interpreting and for sending back to the network (51) at least one request and/or at least one message of at least one user, in function of at least one data and/or at least one presented service and means for communicating with at least one server of at least one third party such as any USSD server, on-device-portal server or other. The USSD client (52) includes at least one transport module (53), including at least one encryption/decryption module (535), at least one decoder interpreter module (54) and at least one presentation module (55). It includes also at least one navigation module (56).

In another preferred embodiment, the client-server system intelligence is located in a particular network server (59) in the mobile telecommunications network (51). Preferably, the network server (59) is located in a core network (69) of the mobile (or cellular) telecommunications network (51) and communicates directly with telecommunications core network elements of the core network (69). In one embodiment, the mobile terminal (11) is inside of the coverage of the mobile telecommunications network (51). In another embodiment, the mobile terminal (11) is outside of the coverage of the mobile telecommunications network (51) and is in the coverage of another mobile telecommunications network. In a particular embodiment, the mobile terminal (11) is inside of the coverage of a telecommunications network, which is not a mobile telecommunications network, for example a telecommunications network which is such as an Internet network, a LAN (Local Area Network), which communicates via Wi-Fi (Wireless LAN) protocol, WiMax (Worldwide Interoperability for Microwave Access) protocol and other protocols.

Figure 6:
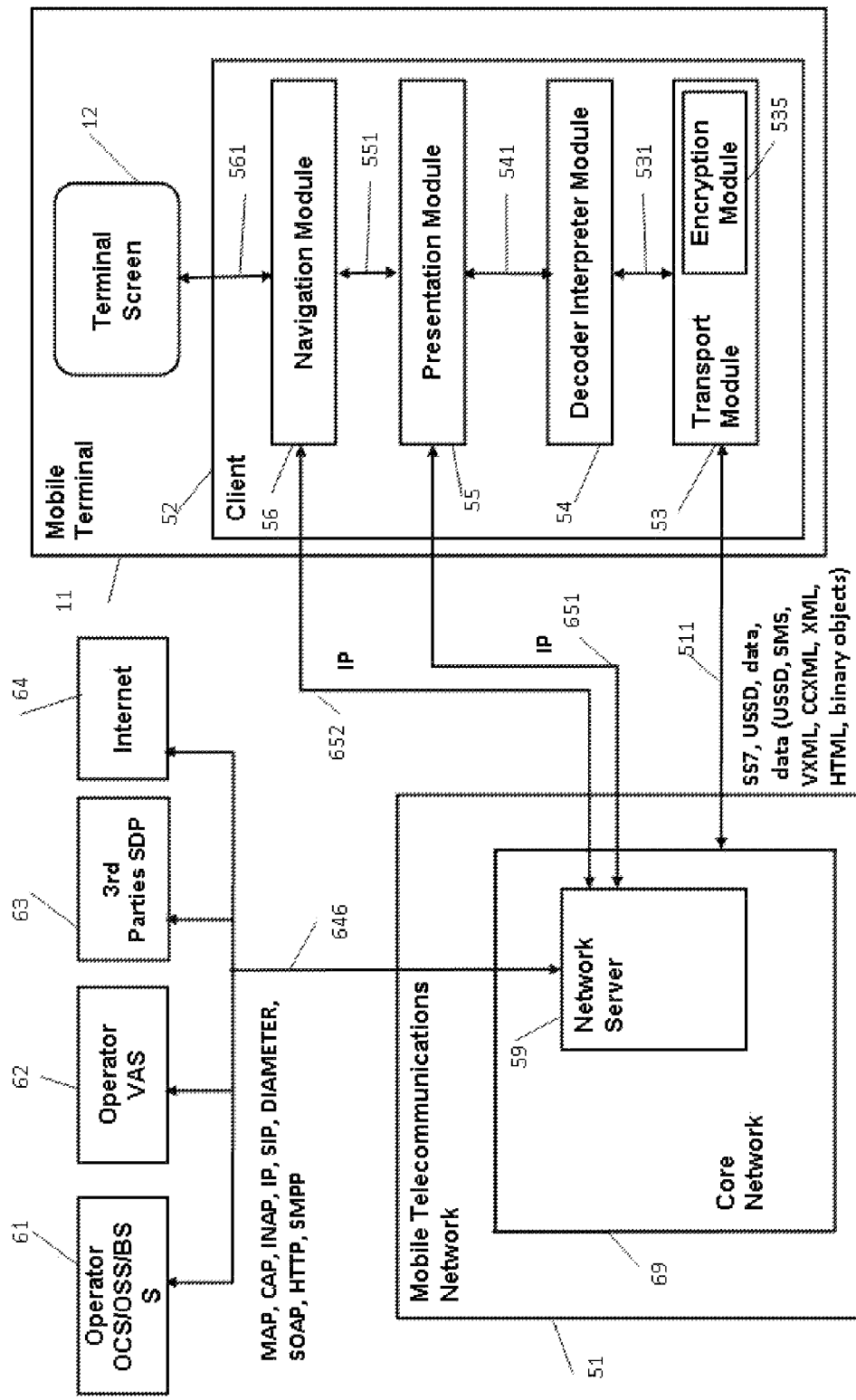
FIG. 6 presents another system architecture embodiment of the client-server system with a network server located in the mobile (or cellular) telecommunications core network of the mobile telecommunications network and communicating with core network elements, with applications and services platforms and with a client embedded in the mobile terminal.

FIG. 6 presents a system architecture example of the client-server system with a network server (59) positioned in a core network (69) of a mobile telecommunications network (51) and linked with external platforms (61), (62), (63) and (64). The network server (59) communicates via a functional link (646) by using standard protocols, such as MAP, CAP ("CAMEL Application Part", application part protocol of CAMEL protocol), INAP ("Intelligent Network Application Protocol", application part for intelligent applications on SS7 protocol) or Diameter protocol with a module (61), which is for example a telecommunications operator IN (Intelligent Network) platform and/or an OCS (Online Charging System) module and/or an OSS (Operational Support System) module and/or an BSS (Business Support System) module. The network server (59) also communicates via the functional link (646) by using standard protocols, such as IP, SOAP ("Simple Object Access Protocol", standard protocol for the WEB services), HTTP, SMPP (Short Message Peer to Peer), SIP (Session Initiation Protocol) and other, with a module (62) which is for example a telecommunications operator SAP (Services and Applications Platform) or VAS (Value Added Services) platform and/or communicates with a module (63) which is for example third party SDP (Service Delivery Platform), for example a BSS platform or a VAS or a CRM (Customer Relation Management) platform and/or communicates with a module (64) which is any Internet platform (64) by using IP and HTTP protocols, for example.

The network server (59) located in the core network (69) of the mobile telecommunications network (51) (sometimes referred to as the mobile telecommunications core network) communicates directly with a set of elements of this core network (69) by using SS7 (Signaling System 7) or MAP (Mobile Application Protocol) protocols, for example.

The "core network" (69) is, for example, a core of GSM ("Global System for Mobile") telecommunications network, of GPRS ("General Packet Services", communications system access with packet services) network, of UMTS ("Universal Mobile Telecommunications System") network, of 3G/3G+ and/or any other types of core NGN (Next Generation Network) network, as for example 4G, LTE ("Long Term Evolution"), etc. For example, the core network (69) is a SS7-type core network and comprises a set of network elements such as HLR module (Home Location Register), VLR module (Visitor Location Register, database platform in a telecommunications system that contains the identifications of the subscribers in use), MSC module (Mobile Switch Center, center for mobile communications), VMSC module (Visited Mobile Switching Center), GMSC module (Gateway Mobile Services Switching Center) or any other module or platform specific for this core network.

In a particular implementation, the network server (59) located within the core network (69) replaces at least one element of the set of core network elements.

The network server (59) performs creation, integration, aggregation, management, deployment, activation, orchestration and providing (or delivery) of core network services and of network services to the user's equipment, said mobile terminal (11).

In the present invention, "service" is typically a set of network and system processing actions that follow a user interaction. The network and system processing actions, provide data processing, storage, presentation and communication, including at least one request-response by the user's terminal and the mobile telecommunications network, and are implemented using a client-server architecture based on telecommunications protocols. Data so provided comprises information and/or instructions, which are structured or unstructured, and also comprises objects with information and/or instructions. Objects may be, for example, objects of an object structured language such as XML, VXML, CCXML, JavaScript (a programming language commonly used in WEB developments) and others, and/or binary objects with digital data with different specific formats.

In the present invention, an "application" is typically a framework for services exposure to a user, which is also an access point to the user of the services. Preferably, an application is presented in a graphical and interactive form, comprising graphic and/or textual elements. An application is typically embedded or downloaded in the mobile terminal of the user. In another implementation, one or more applications are located in a remote server and are accessed remotely by the mobile terminal. An application may also act as a navigator (or a browser) for accessing the services. An application may also act as navigator (or a browser) for other applications.

In one embodiment, the network server (59) communicates with the transport module (53) of the client (52) of the mobile terminal (11) via the link (511) by using SS7 or USSD protocols, for example. In this example, the network server (59) is the USSD Center (59) and the client (52) is the USSD client (52).

In another embodiment, the link (511) carries data protocol comprising SMS, VXML, CCXML, XML, HTML and/or binary objects. In the present invention, the term "link" is a functional link used to depict the particular embodiments and/or method steps and used by the modules to communicate each other with compliant input/output protocols for data exchanges and processing in the scope on the disclosure. Intermediate network layers and protocols of the telecommunications networks are not disclosed with specificity, since the structure and operation of such intermediate layers and protocols are within the knowledge of one skilled in the art.

In another embodiment, the network server (59) communicates directly with the presentation module (55) of the client (52) via a link (651) by using for example IP protocols and exchanges data in HTML formats for example, the data comprising for example objects with information and/or instructions in any format.

In another implementation, the network server (59) communicates directly with the navigation module (56) of the client (52) via a link (652) by using for example IP protocols and exchanges data in HTML formats, the data comprising, for example, objects with information and/or instructions in any format.

In a particular embodiment, the set of core network elements of the core network (69) communicates directly with the transport module (53) of the client (52) of the mobile terminal (11) via the link (511) and by using USSD, data or CAP protocols for example.

FIG. 7 presents a preferred embodiment of the client-server system, where the network server (59) has a particular architecture and comprises a server with telecommunications network browser (75) and a server (72) called "carrier application" server (72). In this case, the client (52) is called "carrier application" client (52).

The network server (59) may comprise modules and devices, such as:
  a server with a telecommunications network browser (75);
  a network gateway (74) platform, comprising connectors modules, which are specific gateway modules for protocol conversion, and/or combinations, and for communication with external and/or internal modules to the network server (59);
  a carrier application server (72) comprising a "carrier application and add-on" database (73) platform;
  a "carrier application and add-on" studio (71) platform.

In one embodiment, the carrier application server (72) communicates directly with a module (756), called "carrier application" module (756) of the navigation module (56) of the client (52) via the link (652) by using for IP protocols and exchanges data in HTML formats, the data comprising structured objects, for example.

In another embodiment, the carrier application module (756) is not required, and the carrier application server (72) communicates directly with the navigation module (56) of the client (52) via a link (652) by using, for example, IP protocols and by exchanging data in HTML format, for example.

In a particular embodiment, the carrier application server (72) communicates directly with the presentation module (55) of the client (52) via a link (651) by using, for example, IP protocols, and by exchanging data comprising information and instructions.

The Network Browser server (75) performs services creation and management, and defines services logic, and comprises, for example, the following modules and servers:
  a CCB module (79) (Call Control Browser, a flexible server for monitoring and for orchestrating of calls);
  a LIB module (78) (Logic and Integration Browser, a server for service logic orchestration and integration);
  a RRS module (77) (Ready to Run Services), a server comprising database platform with stored already defined services, parts of services, information and instructions for services management, and
  a server with SLM module (76) (Service and Logic Management platform) to manage services and services logic from the creation, to the delivery of the services and to control all the modules of the network server (59).

The modules CCB (79), LIB (78), SLM (76) and RRS (77) are linked with internal links, and communicate with each other, exchanging data by using internal protocols. The CCB module (79) is, for example, based on an interpreter of an object structured language such as CCXML (Call Control Extensible Markup Language) and the LIB module (78) is, for example, based on an interpreter of an object structured language, such as VXML (Voice Extensible Markup Language). In a preferred embodiment, the CCB module (79) and the LIB module (78) are merged in a single module.

The SLM module (76) performs supervision of the whole system network server (59) and comprises already existing services logics, grouped, for example, in files and tools for services logic definition. The SLM module comprises also a Graphical User Interfaces (GUI) for:
  a Services Creation Environment (SCE),
  an environment of control, of logic, of switching and of orchestration of services,
  an environment of testing, of deployment and of version control of services.

The SLM module (76) communicates with the RRS module (77). When services are written, they are interpreted by the CCB module (79) and/or by the LIB module (78) and stored in the RRS module (77). The CCB module (79) and the LIB module (78) communicate with the RRS module for objects exchanges and handling.

The SLM module (76) performs also supervision and control functionality for the whole system network server (59), namely for the telecommunications network browser (75) modules CCB (79) and LIB (78). The SLM module (76) performs control functionality and configuration of parameters for the network gateway platform (74). The SLM module (76) communicates, as with the other modules CCB (79), LIB (78) and RRS (77), with the network gateway (74) via a link (754) and by using IP protocols, for example.

In the present invention, a network gateway is a platform comprising a set of intermediate gateway platforms. The gateway connectors perform processing, transmitting signaling and data packets on a network, or on multiple networks, to at least one specified destination. This structure allows communication with elements of heterogeneous networks and heterogeneous devices, servers and platforms. The network gateway preferably comprises interfaces for performing protocols conversion and/or combinations of protocols. The network gateway platform preferably comprises logic and integration modules for complex protocol adaptation, and for management of internal and external connections.

In the present invention, the term "platform" is a set of hardware and/or software components located in a telecommunications network. The platform provides services and/or tools and/or data and performs processing. The platform is able to communicate with other platforms and/or servers, and/or terminal devices and/or telecommunications networks.

The network gateway (74) is preferred to comprise several gateway (or connector) modules. Each gateway module may perform a variety of tasks. For example, an IVR-type gateway provides notification of a call recipient for reverse billing; a CAP-type gateway may be used for reversing the billing in real-time, a MAP gateway provides real-time retrieval of information related to the calling and called party (such as location, type of prepaid or post-paid billing, and others), an USSD gateway is used to trigger the service over USSD, and others. In general, the network gateway (74) comprises many gateway modules for protocols conversion and/or combination and for communicating with external and internal modules. For example, the network module (74) comprises many gateway modules such as HTTP gateway, SOAP gateway, >>ORACLE<<® (server for interface and applications for mobile chain) gateway, >>MySQL<<® (relational database) gateway, SMPP gateway, Diameter gateway and other, in order to communicate with external to the mobile core telecommunications network systems platforms as (61),(62), (63) and (64) via the link (646). Advantageously, the network gateway (74) comprises many gateway modules such as MAP gateway, CAMEL ("Customized Applications for Mobile network Enhanced Logic", allows a telecommunications operator to provide, inside or outside of its own network, special services to its users, such as real-time billing) gateway, SOAP gateway, HTTP gateway, SMPP gateway, in order to communicate with the core network elements. Preferably, the network gateway comprises an USSD gateway module, in order to communicate with the transport module (53) of the client (52) via the link (511) and by using USSD protocols. Advantageously, the network gateway (74) comprises connectors such as SMS, VXML, CCXML, XML, HTML and binary objects connectors, thus the network server communicates with the transport module (53) of the client (52) via the link (511) by using data protocol comprising SMS, VXML, CCXML, XML, HTML and/or binary objects.

The network server (59) is able to provide services which are generally and natively performed by the core network, called "core network" services, such as those typically implemented by the telecommunications operators, for example related to call control and switching based on the call signaling processing, authentication, charging, aggregation of flows to be processed by the core network, gateways for the core network to access another networks, support of Operations Support Systems (OSS) to configure and provision the core network elements, IN (Intelligent Network) providing and support for many OSS and BSS (Business Support Systems), host and maintenance of subscribers database, for example in HLR and in VLR modules.

The client-server system intelligence located in the network server (59) of the mobile telecommunications core network (69) is distributed among the SLM (76) module of the network browser (75) and the network gateway (74), the network gateway having a service logic and integration platform. Thus, protocol objects are built and implemented by sharing of data between the network browser (75) and the network gateway (74), the network gateway (74) performing the adaptation of services objects to protocols complexity, indispensable for communication with the core network and integration of said protocol objects, called also "extensions". In this way, network gateway (74) provides complex functions as for example internal and external connections management, maintenance, login operations, load sharing with external systems, network and devices and other, which are externalized from the SLM module (76), and are transparent for the service creation performed in the services creation environment of the SLM module (76). The protocols complexity impact on services and on protocols parameters management is thus exported in the network gateway (74). For example, for implementation of a SMS control service for a mobile roaming terminal, connections and location management of the roaming terminal are performed in the network gateway (74) and are transparent for the service logic creation related to SMS sending and receiving.

The network server (59) provides additional and complex core network services such as:
  Real time billing services, for example, prepaid billing for Roaming Mobile Originating SMS service;
  Multi-triggering for Mobile Originating Call and Mobile Terminating Call, for voice and SMS calls;
  Incoming and outgoing Call Control;
  Service Control Point (SCP) with CAMEL proxy SCP for visited CAMEL networks;
  Reverse billing;
  USSD callback;
  Virtual mobile number, and others.

In this embodiment, the network server (59) replaces at least one element of the mobile telecommunication core network (69), with the network server (59) performing one or many functionalities of the mobile core network elements.

Core network services are also used as a basis to enable other network (or users) services and applications. Network or users services are specific services, and in general, are end user oriented:
  Services often having complex call control and/or complex billing, which are not provided by the telecommunications operators, for example, many of the services related to the platforms (61) and (63);
  Services called value-added services (VAS), which are also known as non-core network services, for example, services that are related to the platform VAS (62);
  Internet services, for example, services related to the Internet platform (64). Network services are, for example, charging and billing, call filtering, location based services, "infotainment" services, music or video streaming downloads, mobile phone backup, ring back tones, mobile advertisement, mobile payment, mobile voting, Internet services and many other.

The network server (59) provides network services, for example services with complex call control and/or complex billing services, for example, mobile collect call, intelligent call screening, data roaming, community charging services and broadcast advertising.

The network server (59) also offers classical value added services, as services provided from a VAS platform (62), and services provided from an ASP (Application and Service Provider) platform (63) and from an Internet platform (64).

Moreover, the network server (59) provides functions and support for third party providers and for telecommunications operators, and for network services implementation and provision, such as:
  Proxy platform for IN platforms, for messages and signaling;
  Routing platform, which provides mediation between different core network elements and solves network issues related to routing of users, for example routing of prepaid or postpaid users to an IN platform (61), mobile number portability routing, load sharing functions and other functions;
  Interfacing gateway between external services platforms and the core network (69).

In order to perform services logic, a method is defined and implemented in the network browser server module (75). "Service logic" is consecutive operations that implement a service: processing steps, collection of needed data, establishment of links between platforms, servers, devices, modules and elements, data/protocols/languages conversions, request-responses and communications with external systems and telecommunications networks.

Consecutive steps performed by the network server (59) for a service creation, management, implementation and provision are, for example:
  creation of a service as service objects in the service creation environment of the SLM module (76) by using object structured languages, for example XML and/or VXML and/or CCXML;
  creation of a service logic for combining and sequencing of service objects by using a logic tree with nodes and branches and combinations of VXML and CCXML objects in accordance with the service complexity. For example, when consecutive operations have to be performed and links between nodes and operations have to be defined, VXML language may be used. VXML has a request-response (or synchronous) entity and is well adapted for the service processing steps description and integration. For example, VXML is used for the description of steps required for the communication between platforms, for the data exchanges with external services and applications platforms or, for the display of end-users menu on the mobile phone screen. Different processing steps can be described with different VXML files. Each VXML file is considered, for example, as an "object".
  CCXML entity is asynchronous and is used for event handling and state machine representation. Services, including calls, are defined with CCXML; for example, a service for reverse billing or a service for charging a voice call. Another example is when the core network (69) has CAMEL gateway and a third party service is provided by Diameter protocol; thus the service logic is preferably written in CCXML.
  The LIB module (78) and the CCB module (79) are used during service logic creation in accordance to the service complexity. For example, if only USSD menus are used to define a service, VXML for LIB module (78) is used. If the service is complex, such as Reverse Billing, the USSD menu is preferably written in VXML and a B-party subscriber list allowing reverse billing is also written in VXML. The call control part, comprising calls connections, establishment and release of the B-party subscriber to an A-party subscriber, is written in CCXML.
  Integration and interpretation of the service logic into the network browser server (75):
    Interpretation by the network browser (75) of telecommunications protocols embedded in the network gateway (74) modules and used for service implementation;
    Processing of the service objects in a call control browser (79), based on a CCXML language interpreter, extended to support telecommunications protocols, such as SS7, MAP, CAP, ISUP (Integrated Services digital network User Part, part of SS7), INAP, SOAP, IP, HTML, CAMEL, Diameter (IP extension for mobile) or others;
    Processing of the service objects in the logic integration browser (78), based on a VXML language interpreter, extended to support telecommunications protocols, such as SS7, MAP, CAP, CORBA (Common Object Request Broker Architecture), Diameter or others;
    Exchanges of service objects between the call control browser and the logic integration browser;
    Generation of service object extended with protocols and thus producing of "protocol objects".
  communication between the network browser server module (75) and the network gateway platform (74) using protocol objects;
  communication between the network gateway platform (74) and the mobile telecommunications core network (69) elements using protocol objects;
  implementation of the service and provision of the service to users by "browsing" or "navigation" in the core network (69), resulting in provisioning, consultation, interaction, and modification of information in the core network (69) elements, and transfer of services information through a set of mobile telecommunications core network (69) elements.

The core network navigation may perform the following steps and functions:
  Consultation of prior information, such as data, parameters, addresses, links and other information managed in the elements of the core network (69);
  Provisioning of prior information to the modules SLM (76), CCB (79) and LIB (78) of the network browser server (75);
  Interpretation of prior information by the modules of the network browser server (75);
  Defining instructions and other information for core networks (69) elements, performed by the SLM module (76), on the basis of interpreted prior information and in accordance with services requirements and services logic defined by the SLM (76);
  Preparing the instructions and other information, which may contain data, parameters, links and other information, for elements of the core network (69), which are, by default, inaccessible to users;
  Supplying the core network (69) elements with instructions and additional information.

Any service and/or any application of the network server (59) may be implemented by the method described herein. Moreover, through this method, network services and core network services are implemented as applications. The network server (59) may also provide applications, in which multiple services are embedded. In one embodiment, an application comprises services embedded as add-ons. In another embodiment, services are standalone applications. In this way, the network server (59) provides the client (52) of the mobile terminal (11) with services and/or applications, either defined by the telecommunications operator (for example by using the SLM module (76)), or by third party platforms (for example, platform (63) and (64)).

In order to allow efficient and effective implementation of applications while considering delay, costs, ease and ergonomics, the network server (59) comprises module carrier application server (72) for services deployment and delivery. The server (72) preferably comprises module carrier application and add-on database (73) with software components for providing representation of the services, and the module carrier application and add-on studio (71) platform for defining visual presentation, layout arrangement, and packaging, and for linking the services with associated representations. A representation of a service is, for example, an icon, a picture, a widget and/or any visual presentation comprising graphic and/or textual and/or interactive components or similar indicia. The carrier application and add-on studio platform (71) is an environment that provides tools for services visual representation creation, testing and deployment, and which packages services for the mobile terminal (11) as standalone applications, or as add-ons to applications, for the module carrier application client (52).

The carrier applications server (72) is preferably a processing module for receiving queries from the mobile client (52), for processing queries with modules in the network server (59) and for preparing and sending of the required responses to the mobile client (52). The carrier application server (72) communicates with the network browser server (75) for services execution, retrieval, adaptation and delivery. The carrier application server (72) can also execute services or portions of services, and communicates with the network gateway (74) via the link (724) by using IP protocol, for example. The carrier application server (72) thus performs network and core network services retrieval, execution, adaptation and delivery.

For example, an application layout presenting services as graphic icons is displayed on the screen (12) of the mobile terminal (12). The subscriber clicks on a service icon, then a query for this service is sent from the carrier application module (756) of the client (52) to the carrier application server (72) via the link (652) by using IP protocol, for example. When receiving a request (or an invocation) for the service, the carrier application server (72) sends, for example, a request to the RRS module (77) of the network browser server (75) via a link (752) using an IP protocol. In this example, the requested service is executed by the RRS module (77) in the modules CCB (79) and LIB (78), and the received service response is retrieved back to the carrier application server (72). The service response is then provided via the link (652) by using IP protocol to the module (756) of the navigation module (56) and the response representation is displayed on the screen (12) of the mobile terminal (11).

In one implementation, the carrier application client (52) is dedicated to one service. It is packaged by the carrier application and add-on studio (71) as a standalone client (52) for the mobile terminal (12), with only one service, and it sends a request to the carrier application server (72) to obtain the layout of the service. Following user request or automatically based on events, such as mobile terminal (12) timer or a received call or notification from the network, such as for subscription expiration or any other event, the carrier application server (72) executes an initializing network services command, prepares a response comprising a page or pages of content, and sends the response to the carrier application module (756) of the client (52).

In another implementation, the carrier application client (52) sends an incoming request requiring navigation in network services, then the carrier application server (72) redirects via the link (752) the request to the network browser (75), receives a response, reformates the response in a layout page and sends the page to the carrier application module (756) of the client (52).

Different components with information and patterns for layouts, pages, add-ons and configurations for the mobile applications and services are stored in the carrier application and add-on database (73). Already available layouts with embedded and configured services and applications, add-ons and widgets are also present in the carrier application and add-on database (73).

The carrier applications server (72), and thus the carrier application and add-on database (73) communicate via a link (713) by using IP protocols, for example, with the carrier application and add-on studio (71).

The carrier application and add-on studio (71) is an environment with a WEB like GUI (Graphical User Interface) for creation of layouts, pages, add-ons and configurations of applications screens with applications and services to be displayed on the screen (12) of the mobile terminal (11). An add-on is any complementary element which is used to enhance the service functionality and the service presentation, as for example, with graphical elements, audio-visual elements, voice elements or with functional elements as an interface to facilitate the connections with other services in a layout and to enhance the interactivity with the end user. The carrier application and add-on studio (71) communicates with the network gateway (74) via a link (714), and by using IP protocol, for example, in order to extend applications and add-ons with compliant protocols. The carrier application and add-on studio (71) communicates with the network browser (75) via a link (715), and by using IP protocol, for example, in order to configure applications and add-ons for required services. The carrier application and add-on studio (71) allows packaging of the service, for example, thanks to included different programming and compilation tools and technics, as a standalone client (52) for the mobile terminal (12), or as an add-on for the said client (52).

The carrier application and add-on studio (71) is provided to telecommunications operators, third party services and applications providers, applications developers and others, so that they may specify and implement their own applications and services.

The carrier application and add-on studio (71) may provide layout settings, which comprise tools, rules and components to build page layouts. These layouts settings are configurable via a layout editor, which is used for layout design. Layouts provide consistent aesthetics and ergonomics of the pages that will be displayed for the mobile subscribers (or end users). Layout settings comprise, for example:

Templates for color definitions, and page element styling;
Settings for logos to be inserted in the page header;
Configuration settings for ordering of services and bookmarks on the mobile phone screen;
Configuration settings for advertisements and branding.

The carrier application and add-on studio (71) also performs customizable configuration for templates used for layouts, providing editing with different language strings and uploads of images.

For example, templates contain CSS styles for displaying different page elements. Each layout has a different template and an end user with a specific profile and tariff plan can see headers, list boxes and buttons in specific colors. Moreover, templates are editable in different languages. Addition of new languages is enabled and set up by the carrier application and add-on studio (71). Several kinds of images are uploaded and/or modified, for example, logo images, icon images, bookmark images, page images and add-on images. Different customized layouts are also available according to end user profiles, phone numbers or other specific information related to end users.

Moreover, the carrier application and add-on studio (71) may provide visual add-ons settings, which comprise tools, rules and components to build add-ons. Add-ons are, for example, custom applications running in the carrier application module (756) and displayed on the screen (12). For example, a classical add-on is configured with four pages and four navigation buttons. To design add-ons, the carrier application and add-on studio (71) comprises an add-ons visual Editor which allows creation of mobile screens by dragging components from a toolbox with predefined add-ons list, into a mobile phone frame. To build add-ons, an add-ons editor module comprises different configurable components as button, checkbox, grid, line list, text box, chart, or map components for implementing drop-down menus and many other add-ons.

When applications and services menus are designed and configured by the carrier application and add-on studio (71), they are downloaded or uploaded, for example, in the module (756) of the client (52) of the subscriber terminal, and are ready to be displayed on the mobile terminal screen (12) with other applications, as selected by the end user.

Figure 8A:
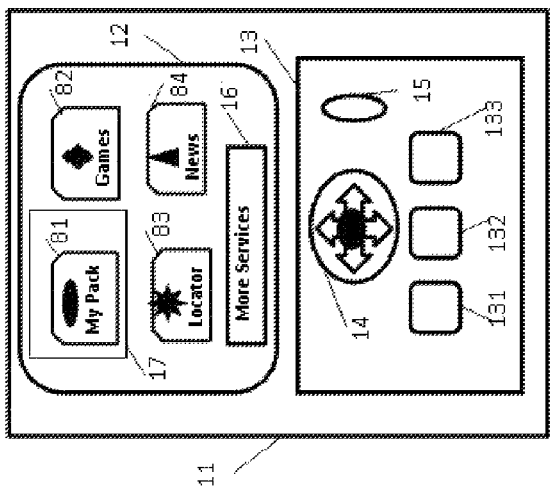
FIGS. 8A, 8B, 8C and 8D present an embodiment of the user interface, as well as navigation steps for an end user when the carrier application client is embedded in the mobile terminal.
Figure 8B:
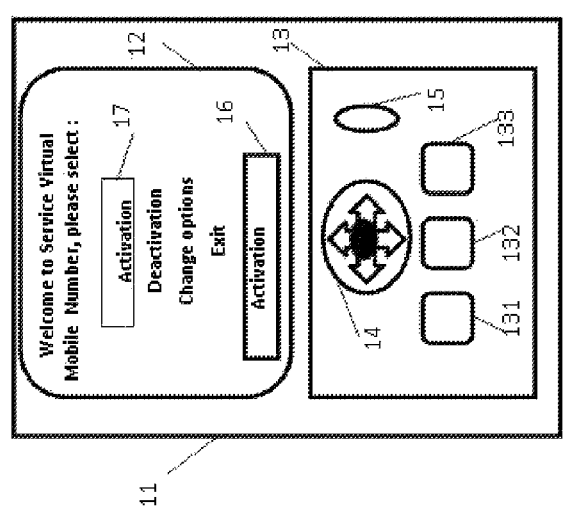
Figure 8C:
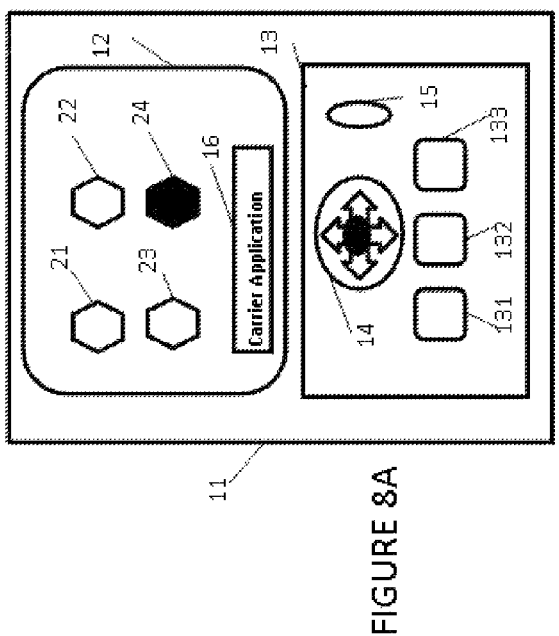

FIGS. 8A, 8B, 8C and 8D present an embodiment with end user navigation steps where the mobile terminal has embedded carrier application client (52) and is able to communicate with the network server (59) through the carrier application server (72), and where the intelligence of the client-server system is located on the server (59) side. The carrier application client (52) is embedded into at least one navigator such as WEB or any other mobile terminal application or user application. For example, the user interface (24) in FIG. 8A of the client (52), embedded in the mobile terminal (11), is presented as an application with clickable icon (24), where the icons (21), (22), (23) and (24) are related to different applications, and available on the screen (12) of the mobile terminal (11). A clickable icon is any interactive picture in the graphical user interface of the mobile terminal (11) that can be activated by the end user, typically by using a simple press or click. The carrier application client icon (24) is available and accessible as an application directly or indirectly, via this graphical user interface. By using navigation key (14), the user selects the icon (24) and activates the carrier application client (52), which may be referred to as a cooperating application. After selecting the carrier application client icon (24), the screen (12) displays a set of clickable icons (81), (82), (83) and (84), each of which is related to digital applications and/or services, as depicted in FIG. 8B. For example, an application associated with icon (81) is for "My pack" services; an application associated with icon (82) is for "Games" services; an application associated with icon (83) is for "Locator" services; and an application associated with icon (84) is for "News" services, as presented in FIG. 8B. When the end user selects, for example, icon (81), a set of new icons is displayed on the mobile phone screen (12), as shown in FIG. 8C. For example, the icon (811) is associated with a "Reverse Billing" service; the icon (812) is associated with a "Virtual Mobile Number" service; the icon (813) is associated with a "Roaming SMS (Short Message Service) service; and the icon (814) is associated with a "USSD Call Back" service. When the end user selects, for example, icon (812), a welcome message with "Virtual Mobile Number" service options is displayed on the screen (12):

"Welcome to Service Virtual
Mobile Number, please select:
Activation
Deactivation
Change option
Exit"

In order to select an option, the end user scrolls by using, for example, the navigation key (14) for positioning of the cursor (17) on the desired choice, which is automatically displayed in a window (16) on bottom on the screen (12), as for example in FIG. 8B, and the choice "More services" is displayed in the window (16), which is associated with icon (81) "My pack".

In this embodiment, end user action to obtain (or to reach) a network service or a core network service from the interactive carrier application client (24) in FIG. 8A, comprises, for example, the following steps:

A step of positioning by using a navigation key (14) for example, on icon (24) of the carrier application client (52). This choice is automatically displayed in a window (16) on screen (12) and is validated by actuating navigation key (14), as shown on FIG. 8A;

A step of scrolling via navigation key (14) in applications icons (81), (82), (83) and (84) and positioning of the cursor (17) on icon (81) "My Pack". A message "More Services" associated with this choice is automatically displayed in a window (16) on the screen (12) and validated by actuating navigation key (14), as shown on FIG. 8B;

A step of scrolling via navigation key (14) add-ons icons (811), (812), (813) and (814), and positioning of the cursor (17) on the icon (812), as depicted in FIG. 8C. This end-user choice is automatically displayed in a window (16) on the screen (12) and validated by actuating navigation key (14);

A step of scrolling via navigation key (14) in a drown-drop menu and positioning of the cursor (17) on the menu option "Activation," for example. This choice is automatically displayed in a window (16) on screen (12) and validated by actuating navigation key (14), as shown on FIG. 8D.

Figure 8D:
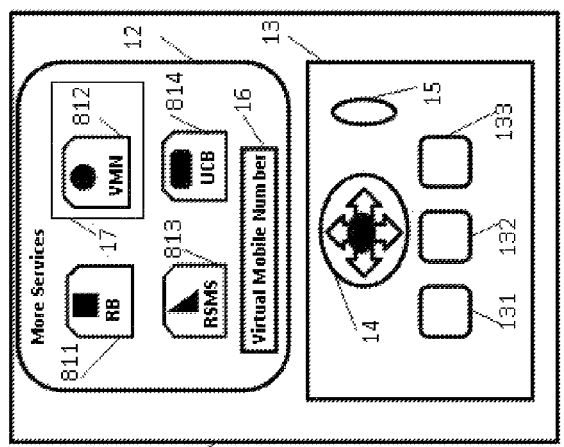

In this embodiment, the processing method for creating, managing and providing a core network service and/or a network service to the end user comprises, for example, the following steps:

steps of creating core network services and/or network services by the module network browser (75) and of storing of these services in the RRS module (77) database;

a step of arranging the representations of these services in application layouts, performed by the carrier application and add-on studio (71) using components of the carrier application and add-on database (73) of the carrier application server (72);

steps of sending an application layout with services add-ons via the link (652) from the carrier application server (72) to the navigation module (56) of the carrier application client (52), and displaying this layout on the screen (12) with applications (81), (82), (83) and (84), for example, with application (81) comprising core network services and applications (82), (83) and (84) comprising network services;

a step of the navigation module (56) interpreting a choice of an application performed using a simple pressing of a key, by an individual subscriber to the mobile telecommunications network, depending on the applications displayed in graphical and/or textual form in an application layout on said screen (12) of the mobile terminal (11), said applications (81) (82), (83) and (84) comprising network services and/or core network services;

a step of the navigation module (56) sending an IP request, for example, to the carrier application server (72) of the network server (59), according to the chosen (or selected) application;

steps of the carrier application server (72) of the network server (59) sending a required application via the link (652) to the navigation module (56) of the carrier application client (52), and displaying on the screen (12) an add-on layout with core network and network services, such as Reverse Billing or RB (811), Virtual Mobile Number or VMN (812), Roaming SMS or RSMS (813) and USSD Call Back or UCB (814);

a step navigation module (56) interpreting a choice of service, the selected service being, for example, "Virtual Mobile Number", performed by an individual subscriber to the mobile telecommunications network pressing a key on a keyboard, according to the add-on layout with services representations displayed in graphical and/or textual form on the screen (12), of the mobile terminal (11);

a step of the navigation module (56) sending an IP request, for example, to the carrier application server (72) of the network server (59), related to the selected service;

a step of the carrier application server (72) retrieving the required network or core network services from the module RRS (77) of the network browser (75);

a step of the carrier application server (72) of the network server (59) sending the required service via the link (652) to the navigation module (56) of the carrier application client (52);

a step of displaying the selected service on the screen (12) of the mobile (11), for example, as depicted in FIG. 8D:
"Welcome to Service Virtual
Mobile Number, please select:
Activation
Deactivation
Change option
Exit"

Virtual mobile number service is an example of a core network service implemented and provided by the network server (59). The service virtual mobile number allows the subscriber to use multiple mobile numbers in a single SIM (Subscriber Identity Module) card without one or more additional SIM cards per phone number. Virtual mobile numbers can be temporary or permanent, with a postpaid or prepaid schedule, self-managed by the end user subscription, for activation, tuning options, renewal and deactivation. For example, when the subscriber selects the option "Activation", a ready to run service "Virtual Mobile Number" is retrieved by the SLM module (76) from the RRS module (77), and the service logic for a virtual mobile number activation is executed. This service logic may comprise, for example:

a step of checking of the subscriber profile from a database comprised in a HLR element of the core network (69), for example, if the profile is prepaid or postpaid or mixed profile, for selecting and configuring related service options for this profile;

a step of attributing a virtual mobile number, and where required, a step of registering of said virtual number in appropriate core network elements;

a step of customizing services options and messages for the subscriber.

The subscriber may then perform multiple actions such as voice call initiation and reception, SMS, data sending and receiving by using virtual numbers associated with available service options. For example, a first subscriber (said A-party) initiates calls, using a virtual mobile number, to a second subscriber (said B-party). MO (Mobile Originating) calls and SMS-MO from a virtual mobile number of A-party may be possible using a prefix before the B-party number. When a MSC (Mobile Switching Center) element of a mobile core network close to A-party detects the prefix, the network server (59) retrieves from said MSC the originated calls to the called party which begins with the virtual number prefix. The network server (59) then performs the appropriate tasks to call B-party without a prefix and changes a CLI (Caller Line Identity) to display a virtual mobile number of the calling A-party to the called B-party. In this case, the network server (59) operates as a MSC in the mobile core network and handles all the actions for mobile originating calls and for mobile terminating calls. The network server (59) also enables calls between two virtual mobile numbers, after applying a check for validity of the virtual mobile numbers for both A-party and B-party.

In a preferred embodiment, core network services and network services are presented as add-ons in an application layout.

In a particular embodiment, core network services and network services are presented as standalone applications.

In a particular implementation, the service welcome menu with options is implemented by using USSD or SMS or email or other messaging protocols.

In another embodiment, the carrier application server (72) communicates with request-response exchanges with the presentation module (55) of the Carrier Application client (52) via link (651), using IP protocol, for example. In this implementation, before displaying a layout with applications and/or services, the presentation module (55) formats a display of received data, which is in a structured language, and sends the data to the navigation module (56) for display. When the end user chooses an application, service or service option, the navigation module (56) sends formatted structured languages data to the presentation module (55), which sends the data to the carrier application server (72).

In a particular implementation, services are provided from platforms that are external to the network server (59), such as platforms (61), (62), (63) and (64), via link (646), through the connectors of the network gateway (74) to the SLM module (76). Thus, the SLM module (76) defines service logic of the services, and manages implementation by using protocol objects and stores them in the RRS module (77). These services from platforms (61), (62), (63) and (64) are provided as standalone applications or as an add-on in applications.

In another particular implementation, the carrier application server (72) sends core network services and networks services applications and add-ons through the link (724), the network gateway (74) and the link (646) to a dedicated server in the Internet platform (64).

In a preferred embodiment, the end user may reach a core network service through the mobile telecommunication network (51), for example, by using link (511), (651) or (652). In a preferred embodiment, the end user may reach and retrieve a core network service without connection to the mobile telecommunication network (51), through any IP network, by using a link such as (652). In another embodiment, the carrier application server (72) stores packaged services in applications or add-on layouts, or services as standalone applications in any server, externally to the mobile telecommunications network, in the Internet platform (64), for example. Thus, the carrier application module (756) of the carrier application client (52) reaches and retrieves packaged core network services as applications from the Internet platform (64) via a link (566) using IP protocol and WI-FI connection, for example.

Advantageously, navigation in the applications and choice of an application or a service are performed, for instance, by using validation key (15) or by using navigation key (14), or by using a predefined key of the digital keyboard (13), or by using a "soft key" (virtual dynamic key).

Advantageously, validation key (15) is merged with navigation key (14).

In another embodiment, the screen (12) of the mobile terminal (11) is a touch screen. In this case, the processing method and the user navigation method may be performed using the same steps, by substituting the simple pressing on a key of the keyboard (13), with pressing on a dedicated zone of the touch screen (11) that is associated with the selected application or service. A navigation pane thus allows navigation via shuffling or swapping (left, right, up, down), and selection via pressing a dedicated zone of the touch screen (11).

In general, user actions to reach and use network services and/or core network services within a telecommunications network are demonstrated by the steps of:
  selecting the icon (24) in FIG. 8A visually representing the carrier application client (52), displayed as standalone application in an applications layout on the screen (13) of the mobile phone (11), and validating the selection;
  scrolling in the applications icons (81), (82), (83) and (84) in FIG. 8B, visually representing network and core network services, and selecting an icon, for example, icon (81), followed by validating the selection;
  scrolling the add-on icons (811), (812), (813) and (814) in FIG. 8C visually representing network services and core network services, selecting the icon (812), for example, representing the chosen service "Virtual Mobile Number" and validating the selection;
  scrolling in the Virtual Mobile Number service options in FIG. 8D, selecting and validating a service option.

In a particular embodiment, a core network or a network service is presented as a standalone application, for example, with icon (81) in the FIG. 8B, thus when the icon (81) is selected and validated, the service options are displayed directly, as for example in FIG. 8D.

Where the mobile phone (11) has a keyboard (13), the steps of scrolling, selecting and validating are performed by the end user by pressing or otherwise actuating a key of the keyboard (13).

Where mobile phone (11) has a touch screen (12), the steps of scrolling, selecting and validating are performed by the end user by swapping and/or touching a dedicated zone of the mobile phone screen (12).

The described client-server architecture depicted in FIG. 7, presents many new features and advantages for telecommunications mobile network operators, third party services and applications providers, terminals manufacturers and subscribers, such as:
  Providing fast and easy exposure of network services and core network services, as mobile applications or as add-ons with visual representation, which provides ergonomic, interactive and attractive presentation of services for the end user;
  Providing for users (telecommunications operators, third party services providers and other) via the network gateway (74) integration interfaces for OCS (Online Charging System), BSCS (Business Support Control System), VAS, IT (Information Technology) and Internet platforms;
  Providing multichannel access to subscribers from digital applications stores, Facebook, WEB, USSD, SMS, IVR (Interactive Voice Response) platforms and others;
  Gives direct access to core network services and network services for the end user (the subscriber) via a user friendly interface of the mobile phone, inside the mobile telecommunications network or outside the mobile telecommunications network;
  Provides simplification of the settings for customization, subscription, charging and use;
  Provides improvement of end user experience, network services and core network services being enabled from any entertainment interface, for example Apple® "iTunes" or Google® "Play" and others, while these network services and core network services continue to be driven by the mobile telecommunications network;
  Provides compliance with applications platforms such as iOS (iPhone Operational System, which is a mobile operational system developed by Apple® and distributed exclusively for Apple® hardware), Android®, Windows Mobile®, HTML5 and others.

The network server (59) is, for example, built by using hardware platforms such as HP ("Hewlett Packard"®), FSC ("Fujitsu-Siemens Computers"®), IBM ("International Business Machines"®) or "SUN Microsystems" ®. The operating system is, for example, a "Red Hat"® or "Fedora Linux" ®, or type "Sun Solaris" ®. Advantageously, the network server (59) may be built on entry-level platforms, which may provide greater accessibility and reduction in cost of implementation.

What is claimed:

1. A digital telecommunications client-server system for creation, management and provision of services within a telecommunications network, comprising:
  a network server, wherein the network server is located within a core network of a mobile telecommunications network, the network server comprising:
    a telecommunications network browser server, wherein the telecommunications network browser server performs creation, management and provision of telecommunications network services and creation, management and provision of core network services;
    a network gateway platform that communicates with the telecommunications network browser server and exchanges data with a set of elements of the core network of the mobile telecommunications network;
    a carrier application server that communicates with the network browser server and with the network gateway platform and that performs services retrieval, execution, adaptation and delivery;
    a carrier application and add-on studio platform that communicates with the carrier application server, the network browser server and the network gateway platform, and performs visually interactive representations of said network services and core network services as applications or as add-ons;

a carrier application client located in a mobile telecommunications terminal of an end user, the carrier application client comprising a transport module, comprising an encryption module, a decoder interpreter module, a presentation module and a navigation module, and wherein the carrier application client communicates with the network server;

wherein the network services and the core network services are provided as applications to the carrier application client of the mobile telecommunications terminal.

2. A digital telecommunications client-server system for creation, management and provision of services within a telecommunications network according to claim 1, wherein said network browser server comprises:

a call control browser for monitoring and orchestrating calls;

a logic and integration browser that provides service logic orchestration and integration;

a service and logic management platform and provides and manages services and services logic creation and controls and configures the network gateway platform, the carrier application server and the carrier application and add-on studio platform; and wherein the network browser server provides ready to run services, services information and instructions for services management for the telecommunications network.

3. A digital telecommunications client-server system for creation, management and provision of services within a telecommunications network according to claim 1, wherein the network gateway comprises connectors modules for protocols conversion and services objects adaptation, and logic and integration platform that implements protocol objects, manages connections and communicates with the network browser server, the carrier application server, the carrier application and add-on studio platform, and communicates with the elements of the core network of the mobile telecommunications network and communicates with platforms of telecommunications operators and third parties that are external to the core network of the mobile telecommunications network.

4. A digital telecommunications client-server system for creation, management and provision of services within a telecommunications network according to claim 1, wherein the carrier application server comprises a carrier application and add-on database that comprises graphics, textual and interactive components that provide visual and interactive representations of said services.

5. A digital telecommunications client-server system for creation, management and provision of services within a telecommunications network according to claim 1, wherein the carrier application and add-on studio platform comprises tools for creation of visually interactive representations of services, and for testing, deployment and packaging of services, provided as a standalone application or as an add-on to an application.

6. A digital telecommunications client-server system for creation, management and provision of services within a telecommunications network according to claim 1, wherein the navigation module of the carrier application client communicates with the carrier applications server of the network server by using Internet protocols.

7. A digital telecommunications client-server system for creation, management and provision of services within a telecommunications network according to claim 1, wherein the navigation module of the carrier application client comprises a carrier application module that communicates with the carrier applications server of the network server by Internet protocols.

8. A digital telecommunications client-server system for creation, management and provision of services within a telecommunications network according to claim 1, wherein the transport module of the carrier application client communicates with the network gateway of the network server by signaling system 7 protocol, unstructured supplementary service data protocol, or data protocol or data protocol comprising short message service objects, voice extensible markup language objects, call control extensible markup language objects, extensible markup language objects, hypertext markup language objects, JavaScript objects or binary objects.

9. A digital telecommunications client-server system for creation, management and provision of services within a telecommunications network according to claim 1, wherein core network services are chosen from a group consisting of native services provided by a core network of a mobile telecommunications network related to call control, switching based on call signaling processing, authentication, charging, aggregation of flows processed by the core network, gateways for the core network that access other networks, support of operations supports systems, support of business support systems, configuration and provision of core network elements, support of intelligent networks, billing, host and maintenance of subscribers databases, complex services provided by a core network of a mobile telecommunications network related to complex call control, services control points, complex charging and billing, virtual services for calling, and network services are chosen from a group consisting of value added services of telecommunications operators and of third parties, call control services, customization services, services provided from services delivery platforms and Internet services.

10. A method of creating, managing and providing services within a telecommunications network, comprising the steps of:

creating core network services or network services in a network browser server, wherein a network server comprises the network browser server;

storing the created core network services or network services in a database having ready to run services, wherein the network browser server comprises the database having ready to run services;

arranging visual and interactive representations of the services as applications in an applications layout provided on a terminal screen of a mobile terminal, and linking the core network services or network services with said representations by a carrier application and add-on studio platform by using graphics, textual and interactive components and layout templates of a carrier application and add-on database of a carrier application server, wherein the network server comprises the carrier application and add-on studio platform and the carrier application server comprises the carrier application and add-on database;

sending by the carrier application server the applications layout comprising said network services or core network services to a navigation module of a carrier application client, wherein the mobile terminal comprises the carrier application client;

displaying on the terminal screen of the mobile terminal the applications layout comprising visual and interactive representations of network services or core network services;

interpreting, by the navigation module, a choice of an application performed by an individual subscriber to the mobile telecommunications network performed by pressing a key of a keyboard of the mobile terminal or by touching a dedicated zone of a touchscreen of the terminal screen of the mobile terminal displaying graphical or textual representations of available applications on the terminal screen of the mobile terminal, said applications comprising network services or core network services;

sending by the navigation module a request to the carrier application server of the network server according to the choice of the application;

sending, by the carrier application server of the network server, a response to the navigation module of the carrier application client according to the choice of the application;

displaying, on the terminal screen, an add-ons layout with visual and interactive representations of network services or of core network services according to the choice of the application;

interpreting, by the navigation module, a choice of the individual subscriber to the mobile telecommunications network, performed by pressing a key of a keyboard of the mobile terminal or by touching a dedicated zone of a touchscreen of the terminal screen of the mobile terminal, with visual and interactive representations of the add-on services layout displayed in graphical or textual form on the terminal screen of the mobile terminal;

sending, by the navigation module, a request to the carrier application server of the network server, according to the add-on of the selected service;

retrieving, by the carrier application server, the required selected service from the database having ready to run services comprised in the network browser;

sending to the navigation module of the carrier application client, by the carrier application server of the network server, the service; and displaying on the terminal screen of the mobile terminal the visual and interactive options of the selected service;

wherein the network server is located in a core network of a mobile telecommunications network and the carrier application client is located in the mobile terminal.

11. The method of creating, managing and providing services within a telecommunications network of claim 10, further comprising a step of packaging, by said carrier application studio, a network service or a core network service as a standalone application or as an add-on in an application.

12. The method of creating, managing and providing services within a telecommunications network of claim 10, further comprising steps of creating, managing and providing a service logic and an implementation for a service provided from a platform that is external to the core network of the mobile telecommunications network, wherein the service provided from the platform that is external to the core network of the mobile telecommunications network is provided as a standalone application or as an add-on in an application.

13. The method of creating, managing and providing services within a telecommunications network of claim 10, further comprising a step of storing of packaged core network services and packaged network services on a server that is in a network external to the mobile telecommunications network.

14. The method of creating, managing and providing services within a telecommunications network of claim 10, further comprising a step of the carrier application client of the mobile terminal retrieving, from a mobile telecommunications network, a core network service as an application.

15. The method of creating, managing and providing services within a telecommunications network of claim 13, further comprising a step of the carrier application client of the mobile terminal retrieving a core network service from a telecommunications network other than the mobile telecommunications network.

16. The method of creating, managing and providing services within a telecommunications network of claim 10, wherein core network services are chosen from a group consisting of native services provided by a core network of a mobile telecommunications network related to call control, switching based on call signaling processing, authentication, charging, aggregation of flows processed by the core network, gateways for the core network that access other networks, support of operations support systems, support of business support systems, configuration and provision of core network elements, support of intelligent networks, billing, host and maintenance of subscribers databases, complex services provided by a core network of a mobile telecommunications network related to complex call control, services control points, complex charging and billing, virtual services for calling, and network services are chosen from a group consisting of value added services of telecommunications operators and of third parties, call control services, customization services, services provided from services delivery platforms and Internet services.

17. A method of retrieving and using network services and core network services within a telecommunications network comprising the steps of:

selecting an icon of a mobile terminal that visually represents an interactive carrier application client, wherein the icon is displayed as representing a stand-alone application in an applications layout on a terminal screen of the mobile terminal and validating selection of the icon;

scrolling through a plurality of applications icons that are displayed on the terminal screen, the plurality of applications icons representing visually interactive network services and core network services, and selecting an icon from the plurality of icons, and validating selection of the icon;

scrolling through a plurality of add-on icons each of the plurality of add-on icons representing a visually interactive network service or a core network service, selecting an icon of the plurality of add-on icons, and validating selection of the icon chosen from the plurality of icons; and scrolling in visually interactive options of a chosen service, selecting an option from the visually interactive options, and validating the option selected;

wherein said steps are performed by an end user of the mobile terminal by pressing a key of a keyboard of the mobile terminal or by touching a dedicated zone of a touchscreen of the mobile terminal; and wherein said interactive carrier application client is located in a mobile telecommunications terminal of an end user, the carrier application client comprising a transport module, comprising an encryption module, a decoder interpreter module, a presentation module and a navigation module, and wherein the carrier application client communicates with a network server, the network server being located within a core network of a mobile telecommunications network and the network server comprising:
- a telecommunications network browser server, wherein the telecommunications network browser server performs creation, management and provision of telecommunications network services and creation, management and provision of core network services;
- a network gateway platform that communicates with the telecommunications network browser server and exchanges data with a set of elements of the core network of the mobile telecommunications network;
- a carrier application server that communicates with the network browser server and with the network gateway platform and that performs services retrieval, execution, adaptation and delivery;
- a carrier application and add-on studio platform that communicates with the carrier application server, the network browser server and the network gateway platform, and performs visually interactive representations of said network services and core network services as applications or as add-ons.

18. The method of creating, managing and providing services within a telecommunications network of claim 17, wherein core network services are chosen from a group consisting of native services provided by a core network of a mobile telecommunications network related to call control, switching based on call signaling processing, authentication, charging, aggregation of flows processed by the core network, gateways for the core network that access other networks, support of operations support systems, support of business support systems, configuration and provision of core network elements, support of intelligent networks, billing, host and maintenance of subscribers databases, complex services provided by a core network of a mobile telecommunications network related to complex call control, services control points, complex charging and billing, virtual services for calling, and network services are chosen from a group consisting of value added services of telecommunications operators and of third parties, call control services, customization services, services provided from services delivery platforms and Internet services.

* * * * *